US012587003B2

(12) United States Patent　(10) Patent No.:　US 12,587,003 B2
Oda et al.　(45) Date of Patent:　Mar. 24, 2026

(54) ON-BOARD DEVICE

(71) Applicants:AutoNetworks Technologies, Ltd.,
Yokkaichi (JP); **Sumitomo Wiring
Systems, Ltd.,** Yokkaichi (JP);
Sumitomo Electric Industries, Ltd.,
Osaka (JP)

(72) Inventors: Kota Oda, Yokkaich (JP); **Ryosuke
Masuda, Yokkaichi (JP); Masaya Ina**,
Yokkaichi (JP)

(73) Assignees: AutoNetworks Technologies, Ltd.,
Yokkaichi (JP); **Sumitomo Wiring
Systems, Ltd.,** Yokkaichi (JP);
Sumitomo Electric Industries, Ltd.,
Osaka (JP)

( * ) Notice: Subject to any disclaimer, the term of this
patent is extended or adjusted under 35
U.S.C. 154(b) by 148 days.

(21) Appl. No.: 18/571,996

(22) PCT Filed: Jun. 13, 2022

(86) PCT No.: PCT/JP2022/023620
§ 371 (c)(1),
(2) Date: Dec. 19, 2023

(87) PCT Pub. No.: WO2023/276634
PCT Pub. Date: Jan. 5, 2023

(65) Prior Publication Data
US 2024/0297493 A1　Sep. 5, 2024

(30) Foreign Application Priority Data
Jun. 30, 2021　(JP) ................................. 2021-109475

(51) Int. Cl.
*H02H 3/04*　(2006.01)
*B60L 3/00*　(2019.01)
*H02H 3/087*　(2006.01)
(52) U.S. Cl.
CPC ........... *H02H 3/046* (2013.01); *B60L 3/0046*
(2013.01); *H02H 3/087* (2013.01)
(58) Field of Classification Search
CPC ...... H02H 3/046; H02H 3/087; B60L 3/0046;
H01H 85/46; G01R 31/74
(Continued)

(56) References Cited

U.S. PATENT DOCUMENTS 4,554,607 A * 11/1985 Mora ...................... H02H 3/046
340/638
9,541,593 B2 * 1/2017 Towers .................. G01R 31/52
(Continued)

FOREIGN PATENT DOCUMENTS

JP　　S59-162766 U　10/1984
JP　　S63-292548 A　11/1988
(Continued)

*Primary Examiner* — Omar CasillasHernandez
(74) *Attorney, Agent, or Firm* — Honigman LLP

(57) ABSTRACT
An ECU (on-board device) includes a fuse F1 and a blown
fuse detection circuit. The blown fuse detection circuit
monitors a fuse voltage between two connection nodes
respectively located upstream and downstream of the fuse in
a current path of a current flowing from a positive electrode
of a DC power supply through the fuse. The blown fuse
detection circuit outputs a voltage lower than a reference
voltage if the fuse voltage is lower than a voltage threshold
value. The blown fuse detection circuit outputs a voltage
higher than or equal to the reference voltage if the fuse
voltage is higher than or equal to the voltage threshold value.

10 Claims, 13 Drawing Sheets

(58) Field of Classification Search
USPC .......................................................... 340/638
See application file for complete search history.

(56) References Cited

U.S. PATENT DOCUMENTS

| | | | | |
|---|---|---|---|---|
| 11,370,324 B2 * | 6/2022 | Douglass | ............... | H02H 3/087 |
| 2005/0243491 A1 * | 11/2005 | Tanis | .................... | H02H 3/046 |
| | | | | 361/104 |
| 2018/0337525 A1 | 11/2018 | Horii | | |

FOREIGN PATENT DOCUMENTS

| | | | |
|---|---|---|---|
| JP | 6410538 | * | 1/1989 |
| JP | S64-010538 A | | 1/1989 |
| JP | 2003-212065 A | | 7/2003 |
| JP | 2005-019133 A | | 1/2005 |
| JP | 2005019133 | * | 1/2005 |
| JP | 2006-318768 A | | 11/2006 |
| JP | 2006318768 | * | 11/2006 |

* cited by examiner

ON-BOARD DEVICE

CROSS-REFERENCE TO RELATED APPLICATIONS

This application is the U.S. national stage of PCT/JP2022/023620 filed on Jun. 13, 2022, which claims priority of Japanese Patent Application No. JP 2021-109475 filed on Jun. 30, 2021, the contents of which are incorporated herein.

TECHNICAL FIELD

The present disclosure relates to an on-board device.

BACKGROUND

JP 2003-212065A discloses an on-board device provided with fuses. According to JP 2003-212065A, a battery supplies power to loads via the fuses.

JP 2003-212065A does not take into consideration a method for checking whether or not a fuse has blown. If it is necessary for a person to visually check whether or not a fuse has blown, the fuse needs to be placed in a location within the on-board device where the person can see the fuse. Therefore, the place where the fuse can be placed is limited.

The present disclosure has been made in view of such circumstances, and an aim thereof is to provide an on-board device with a high degree of freedom regarding the position of the fuse.

SUMMARY

An on-board device according to one aspect of the present disclosure includes: a fuse; and a blown fuse detection circuit configured to detect that the fuse has blown, wherein the blown fuse detection circuit is configured to: monitor a fuse voltage between two connection nodes respectively located upstream and downstream of the fuse in a current path of a current flowing from a positive electrode of a DC power supply through the fuse; output a voltage lower than a reference voltage if the fuse voltage is lower than a voltage threshold value; and output a voltage higher than or equal to the reference voltage if the fuse voltage is higher than or equal to the voltage threshold value.

Advantageous Effects

According to the above aspect, it is possible to realize a high degree of freedom regarding the position of the fuse.

DETAILED DESCRIPTION OF PREFERRED EMBODIMENTS

Figure 1:
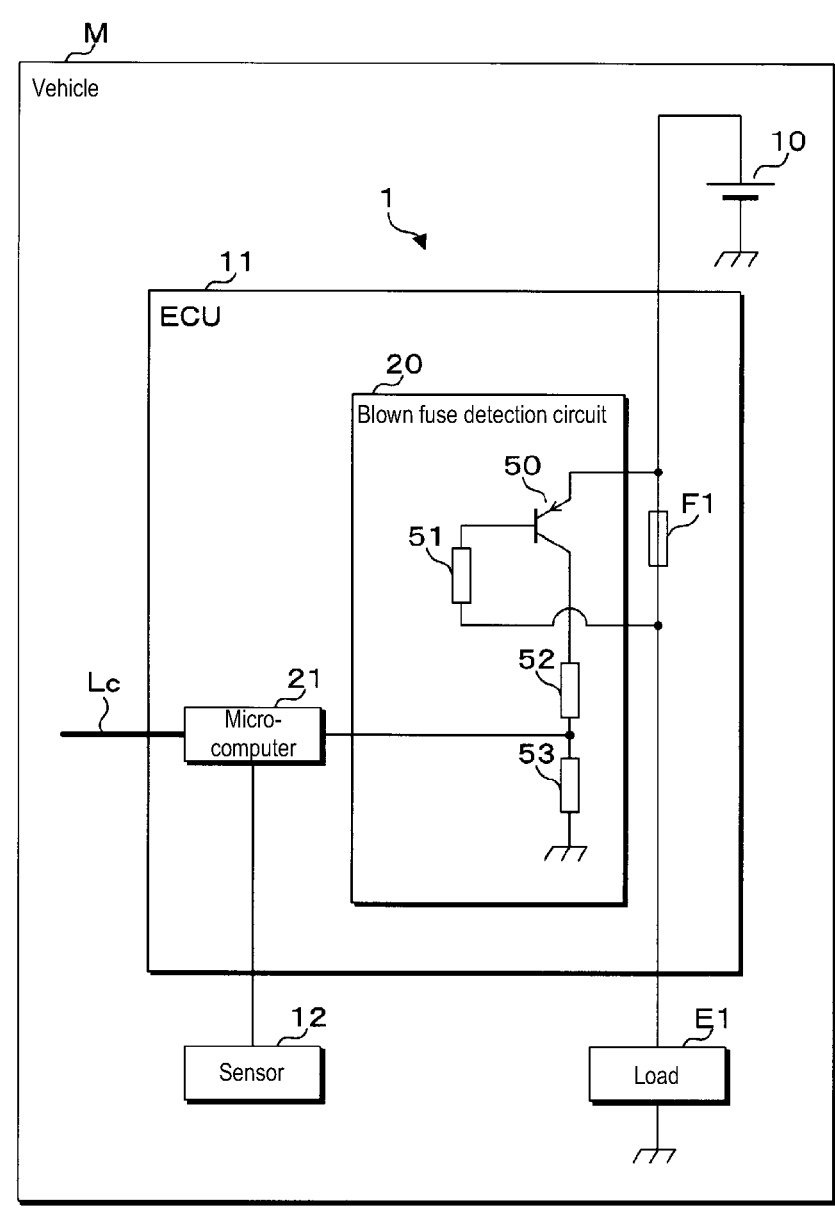
FIG. 1 is a block diagram showing a configuration of a main portion of a power supply system according to a first embodiment.

First, aspects of the present disclosure will be listed and described. At least some of the embodiments described below may be freely combined.

An on-board device according to one aspect of the present disclosure includes: a fuse; and a blown fuse detection circuit configured to detect that the fuse has blown, wherein the blown fuse detection circuit is configured to: monitor a fuse voltage between two connection nodes respectively located upstream and downstream of the fuse in a current path of a current flowing from a positive electrode of a DC power supply through the fuse; output a voltage lower than a reference voltage if the fuse voltage is lower than a voltage threshold value; and output a voltage higher than or equal to the reference voltage if the fuse voltage is higher than or equal to the voltage threshold value.

According to the above aspect, if the fuse has not blown, the fuse voltage is substantially zero V. If the fuse blows, the current flow through the current path stops. Therefore, in the case where a connection node located downstream of the fuse is connected to a ground conductor via a load, a resistor, or the like, if the fuse blows, the voltage at the connection node located downstream of the fuse decreases. As a result, the fuse voltage increases from zero V. The voltage threshold value is set to a positive value near zero V, for example. In such a case, when the fuse blows, the blown fuse detection circuit outputs a voltage higher than or equal to the reference voltage. Thus, information is provided to indicate that the fuse has blown. With this configuration, there is no need for a person to visually check whether or not the fuse has blown, and therefore, there is a high degree of freedom regarding the position of the fuse.

In an on-board device according to one aspect of the present disclosure includes a substrate, and a terminal of the fuse is attached to the substrate with solder.

According to the above aspect, the fuse is attached to the substrate. If the fuse blows, the substrate is replaced.

In an on-board device according to one aspect of the present disclosure, the blown fuse detection circuit includes: a circuit switch provided on a second current path of a current flowing from a connection node located upstream of the fuse in the current path; and a circuit resistor provided downstream of the circuit switch in the second current path, the circuit switch is configured to switch from off to on when the fuse voltage increases to a voltage higher than or equal to the voltage threshold value, and a voltage at an upstream end of the circuit resistor is output from the blown fuse detection circuit.

According to the above aspect, in the case where the connection node located downstream of the fuse is connected to a ground conductor through a load, a resistor, or the like, when the fuse blows, the fuse voltage increases to a voltage higher than or equal to the voltage threshold value as described above. If the fuse voltage increases to a voltage higher than or equal to the voltage threshold value, the circuit switch switches from off to on. If the circuit switch is off, no current flows through the circuit resistor, and therefore the output voltage of the blown fuse detection circuit is zero V. If the circuit switch switches from off to on, current flows through the circuit resistor, and the output voltage of the blown fuse detection circuit increases from zero V. The reference voltage is set to a positive value near zero V, for example. In such a case, when the fuse blows, a voltage higher than or equal to the reference voltage is output from the blown fuse detection circuit.

In an on-board device according to one aspect of the present disclosure, the blown fuse detection circuit includes a second circuit resistor located upstream of the circuit resistor in the second current path, when the circuit switch is on, the circuit resistor and the second circuit resistor divide a voltage at a connection node located upstream of the fuse in the current path, and the voltage divided by the circuit resistor and the second circuit resistor is output from the blown fuse detection circuit.

According to the above aspect, if the circuit switch is on, a voltage divided by the circuit resistor and the second circuit resistor is output from the blown fuse detection circuit. Therefore, the voltage output from the blown fuse detection circuit when the circuit switch is on is determined by the resistance values of the circuit resistor and the second circuit resistor. By adjusting the resistance values of the circuit resistor and the second circuit resistor, the voltage output from the blown fuse detection circuit when the circuit switch is on can be adjusted.

An on-board device according to one aspect of the present disclosure includes: a device switch; a device resistor connected in series to the device switch; and a processing unit configured to perform processing, wherein a series circuit including the device switch and the device resistor is connected between two ends of an upstream switch located upstream of the fuse in the current path, and the processing unit is configured to: switch on the device switch; and in a state where the device switch is on, determine whether or not the fuse has blown, based on a voltage output from the blown fuse detection circuit.

According to the above aspect, if the upstream switch is off, the processing unit switches on the device switch. In the state where the device switch is on, the processing unit determines whether or not the fuse has blown, based on the voltage output from the blown fuse detection circuit. Since current flows through the device resistor, the current value of the current flowing through the fuse is kept low.

An on-board device according to one aspect of the present disclosure includes: a path switch and a path resistor provided on a third current path of a current flowing from a connection node located downstream of the fuse in the current path; and a processing unit configured to perform processing, the processing unit is configured to: switch on the path switch; and in a state where the path switch is on, determine whether or not the fuse has blown, based on a voltage output from the blown fuse detection circuit.

According to the above aspect, if the path switch is on, the connection node located downstream of the fuse is connected to the ground conductor through the path resistor. As a result, the blown fuse detection circuit operates properly.

In an on-board device according to one aspect of the present disclosure, a downstream switch is provided downstream of the fuse in the current path, and in the current path, a current flows from a connection node located between the fuse and the downstream switch through the third current path.

According to the above aspect, if the downstream switch is off, the connection node located downstream of the fuse is connected to the ground conductor through the path resistor by switching on the path switch.

An on-board device according to one aspect of the present disclosure includes: a plurality of fuses, wherein a plurality of currents flowing from the positive terminal of the DC power supply respectively flow through the plurality of fuses, and the blown fuse detection circuit is configured to: monitor the fuse voltage in each of a plurality of current paths of the plurality of currents flowing from the positive electrode of the DC power supply through the plurality of fuses, output a voltage lower than the reference voltage if all the fuse voltages are lower than the voltage threshold value; and output a voltage higher than or equal to the reference voltage if at least one of the plurality of fuse voltages is higher than or equal to the voltage threshold value.

According to the above aspect, in the case where the connection nodes respectively located downstream of the plurality of fuses are connected to the ground conductor through loads, resistor, or the like, if at least one of the plurality of fuses blows, the blown fuse detection circuit outputs a voltage higher than or equal to the reference voltage.

In an on-board device according to one aspect of the present disclosure, in each of one or more specific paths included in the plurality of current paths, a current flows from a connection node located downstream of the fuse corresponding thereto through the third current path, the on-board device includes: a plurality of path resistors respectively provided on the one or more third current paths; a path switch provided on a common section of the one or more third current paths; and a processing unit configured to perform processing, and the processing unit is configured to: switch on the path switch; and in a state where the path switch is on, determine whether or not at least one of the plurality of fuses has blown, based on a voltage output from the blown fuse detection circuit.

According to the above aspect, the connection nodes located downstream of the fuses in the specific paths are connected to the ground conductor through the path resistors by switching on the path switches.

In an on-board device according to one aspect of the present disclosure, in each of the specific paths, a downstream switch is provided downstream of the fuse corresponding thereto, and in each of the specific paths, a current flows from a connection node located between the fuse corresponding thereto and the downstream switch through the third current path corresponding thereto.

According to the above aspect, even if the downstream switch is off, the connection nodes located downstream of the fuses in the specific paths are connected to the ground conductor through the path resistors by switching on the path switches.

In an on-board device according to one aspect of the present disclosure, in each of one or more second specific paths included in the plurality of current paths, a second upstream switch is provided upstream of the fuse corresponding thereto, and the fuse voltage in each of the second specific paths is a voltage between a connection node located upstream of the second upstream switch and a connection node located downstream of the fuse corresponding thereto.

According to the above aspect, in the case where the connection nodes located downstream of the fuses are connected to the ground conductor through a load, a resistor, or the like, if all the second upstream switches are on, the blown fuse detection circuit operates properly.

Details of Embodiments of the Present Disclosure

Specific examples of a power supply system according to embodiments of the present disclosure will be described below with reference to the drawings. Note that the present disclosure is not limited to these examples, but is shown by the scope of claims and is intended to include all modifications within the meaning and scope equivalent to the scope of claims.

First Embodiment

Configuration of Power Supply System

FIG. 1 is a block diagram showing a configuration of a main portion of a power supply system 1 according to a first embodiment. The power supply system 1 is installed in a vehicle M. The power supply system 1 includes a DC power supply 10, an ECU (Electronic Control Unit) 11, a sensor 12, and a load E1. The DC power supply 10 is, for example, a battery. The load E1 is an electrical device. The ECU 11 includes a blown fuse detection circuit 20, a microcomputer 21, and a fuse F1. The ECU 11 serves as an on-board device.

The negative electrode of the DC power supply 10 is grounded. Grounding is achieved by connection to a ground conductor. The ground conductor is, for example, the body of the vehicle M. The positive electrode of the DC power supply 10 is connected to one end of the fuse F1 in the ECU 11. The other end of the fuse F1 is connected to one end of the load E1. The other end of the load E1 is grounded. Current flows from the positive electrode of the DC power supply 10 to the fuse F1 and the load E1 in this order. Thus, power is supplied to the load E1.

Hereinafter, the path of the current flowing from the positive electrode of the DC power supply 10 via the fuse F1 is simply referred to as "current path". In the current path, a connection node located upstream of the fuse F1 is referred to as "upstream node". In the current path, a connection node located downstream of the fuse F1 is referred to as "downstream node". The upstream node is located downstream of the DC power supply 10. The downstream node is located upstream of the load E1. The upstream node and the downstream node are separately connected to the blown fuse detection circuit 20. The blown fuse detection circuit 20 is further connected to the microcomputer 21. The microcomputer 21 is further connected to a communication line Lc and the sensor 12.

If current flows through the fuse F1, the fuse F1 generates heat. The amount of heat generated by the fuse F1 increases as the current value of the current flowing through the fuse F1 increases. Regarding the fuse F1, if the amount of heat generated per unit time is greater than the amount of heat dissipated per unit time, the temperature of the fuse F1 increases. Regarding the fuse F1, if the amount of heat generated per unit time is less than the amount of heat dissipated per unit time, the temperature of the fuse F1 decreases. If the temperature of the fuse F1 increases to a temperature higher than or equal to a certain temperature threshold value, the fuse F1 blows. If the fuse F1 blows, the current flow through the fuse F1 stops.

Therefore, if a current having a current value greater than or equal to a certain value flows through the fuse F1, the fuse F1 blows. Thus, overcurrent is prevented from flowing through the load E1.

Hereinafter, the voltage at the upstream node and the voltage at the downstream node are referred to as "upstream voltage" and "downstream voltage", respectively. The reference potential for each of the upstream and downstream voltages is the ground potential. The voltage between the upstream node and the downstream node is referred to as "fuse voltage". The fuse voltage is calculated by subtracting the downstream voltage from the upstream voltage. The voltage across the DC power supply 10 is referred to as "power supply voltage".

The resistance value of the fuse F1 is sufficiently low. Therefore, if the fuse F1 has not blown, the fuse voltage is substantially zero V regardless of whether or not current is flowing through the fuse F1. Regardless of whether or not the fuse F1 has blown, the upstream voltage of the fuse F1 is substantially the same as the power supply voltage of the DC power supply 10.

If the fuse F1 blows, the current flow through the load E1 stops. If the current flow through the load E1 stops, no voltage drop will occur in the load E1. Therefore, if the fuse F1 blows, the downstream voltage of the fuse F1 decreases. At this time, the downstream voltage is substantially zero V. Therefore, if the fuse F1 blows, the fuse voltage increases from zero V. At this time, the fuse voltage is substantially the power supply voltage. The power supply voltage of the DC power supply 10 is 12 V, for example.

The blown fuse detection circuit 20 outputs a voltage lower than a certain reference voltage to the microcomputer 21 if the fuse voltage of the fuse F1 is lower than a certain voltage threshold value. If the fuse voltage of the fuse F1 is higher than or equal to the voltage threshold value, the blown fuse detection circuit 20 outputs a voltage higher than or equal to the reference voltage to the microcomputer 21.

The voltage threshold value is set to a voltage higher than the fuse voltage if the fuse F1 has not blown. Furthermore, the voltage threshold value is set to a voltage lower than or equal to the fuse voltage when the fuse F1 has blown.

The blown fuse detection circuit 20 monitors the fuse voltage. If the fuse voltage of the fuse F1 is lower than the voltage threshold value, the blown fuse detection circuit 20 outputs a voltage lower than the reference voltage to the microcomputer 21. If the fuse voltage of the fuse F1 is higher than or equal to the voltage threshold value, the blown fuse detection circuit 20 outputs a voltage higher than or equal to the reference voltage to the microcomputer 21. Therefore, if the fuse voltage increases to a voltage higher than or equal to the voltage threshold value, the blown fuse detection circuit 20 detects that the fuse F1 has blown.

The microcomputer 21 includes a processing element (not shown) that performs processing, and a storage unit (not shown). The processing element is, for example, a CPU (Central Processing Unit). The storage unit stores computer programs. The processing element of the microcomputer 21 performs various kinds of processing by executing the computer programs. The microcomputer 21 serves as a processing unit.

The microcomputer 21 determines whether or not the fuse F1 has blown, based on the output voltage of the blown fuse detection circuit 20. If the output voltage of the blown fuse detection circuit 20 is lower than the reference voltage, the microcomputer 21 determines that the fuse F1 has not blown. If the output voltage of the blown fuse detection circuit 20 is higher than or equal to the reference voltage, the microcomputer 21 determines that the fuse F1 has blown.

If the microcomputer 21 detects that the fuse F1 has blown, the microcomputer 21 outputs blown fuse data indicating that the fuse F1 has blown, to the outside of the ECU 11 via the communication line Lc. Thus, information is provided to indicate that the fuse F1 has blown.

The sensor 12 detects values related to the vehicle M. The detection values detected by the sensor 12 may be the speed of the vehicle M, the acceleration of the vehicle M, or the brightness around the vehicle M, for example. The sensor 12 outputs sensor data indicating the detection values to the microcomputer 21. The microcomputer 21 transmits the sensor data input from the sensor 12, to the outside via communication line Lc. The microcomputer 21 receives various kinds of data via the communication line Lc.

The microcomputer 21 may output an operation signal indicating the operation of the load E1 to the load E1. If this is the case, the microcomputer 21 determines the operation of the load E1 based on the data received via the communication line Lc or the sensor data input from the sensor 12. The microcomputer 21 outputs the operation signal indicating the determined operation, to the load E1. The load E1 performs the operation indicated by the operation signal input from the microcomputer 21.

Position of Fuse F1

Figure 2:
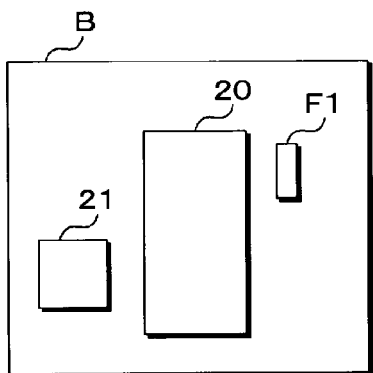
FIG. 2 is a diagram illustrating the position of a fuse.

FIG. 2 is a diagram illustrating the position of the fuse F1. The ECU 11 includes a rectangular substrate B. The blown fuse detection circuit 20, the microcomputer 21, and the fuse F1 are arranged on the main surface of the substrate B. The main surface of the substrate is a wide surface, and is not an end surface.

Installation of Fuse F1

Figure 3:
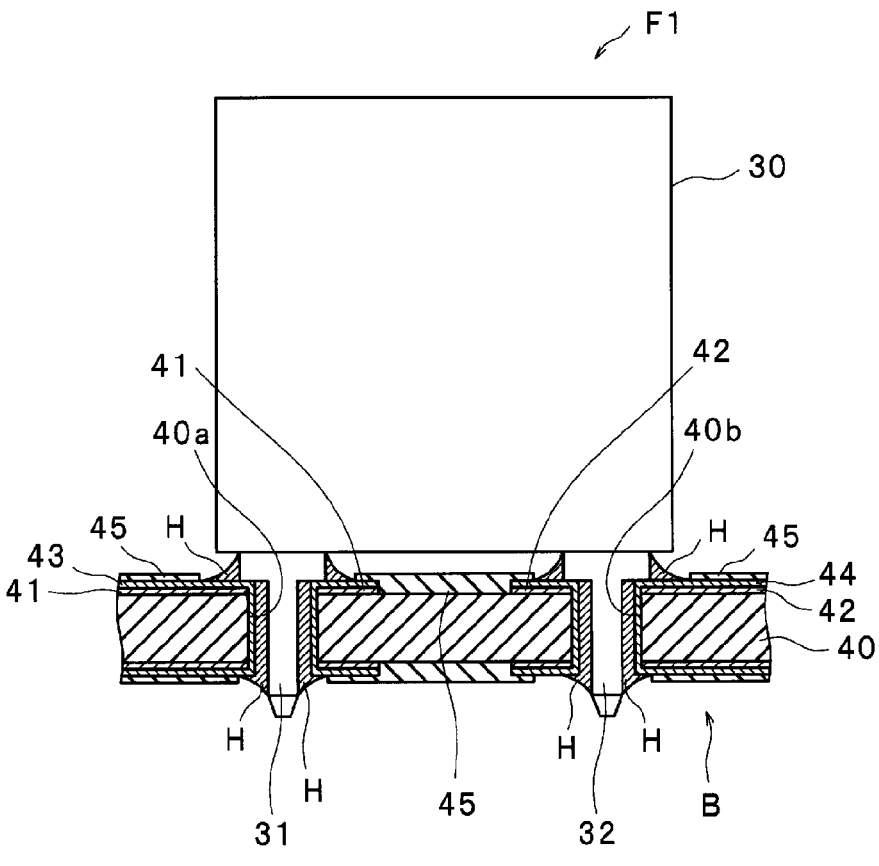
FIG. 3 is a diagram illustrating installation of the fuse.

FIG. 3 is a diagram illustrating installation of the fuse F1. FIG. 3 shows an external appearance of the fuse F1 and a cross section of the substrate B. In the fuse F1, a first terminal 31 and a second terminal 32, which are rod-shaped, are housed in a housing box 30, which is a hollow rectangular parallelepiped with one face open. One end portion of the first terminal 31 and one end portion of the second terminal 32 protrude outward from the open face of the housing box 30.

In the housing box 30, the first terminal 31 and the second terminal 32 are connected to each other by a fusing portion (not shown). Current flows through the first terminal 31, the fusing portion, and the second terminal 32 in this order. If current flows through the fusing portion, the fusing portion generates heat. The amount of heat generated by the fusing portion increases as the current value of the current flowing through the fusing portion increases. Regarding the fusing portion, if the amount of heat generated per unit time is less than the amount of heat dissipated per unit time, the temperature of the fusing portion decreases. If the temperature of the fusing portion increases to a temperature higher than or equal to the above-described temperature threshold value, the fusing portion blows. If the fusing portion blows, the current flow through the fusing portion stops. The blowing of the fuse F1 is the blowing of the fusing portion.

An insulating plate 40, which is a rectangular plate having insulating properties, is positioned on the substrate B. The insulating plate 40 is provided with a first through hole 40a and a second through hole 40b, which pass through the insulating plate 40 in the thickness direction thereof. On the upper main surface of the insulating plate 40, a first conductive pattern 41 and a second conductive pattern 42, which are conductive, are arranged around the first through hole 40a and the second through hole 40b, respectively.

In the substrate B, the inner surface of the first through hole 40a is covered with a first plating 43, which is conductive. The first plating 43 includes, in addition to an inner surface portion that covers the inner surface of the first through hole 40a, an upper portion that covers the insulating plate 40 from above the first conductive pattern 41, and a lower portion that covers the insulating plate 40 from below. The inner surface portion of the first plating 43 is coupled to both the upper portion and the lower portion. The first plating 43 is electrically connected to the first conductive pattern 41.

Similarly, in the substrate B, the inner surface of the second through hole 40b is covered with a second plating 44, which is conductive. The second plating 44 includes, in addition to an inner surface portion that covers the inner surface of the second through hole 40b, an upper portion that covers the insulating plate 40 from above the second conductive pattern 42, and a lower portion that covers the insulating plate 40 from below. The inner surface portion of the second plating 44 is coupled to both the upper portion and the lower portion. The second plating 44 is electrically connected to the second conductive pattern 42.

The first terminal 31 and the second terminal 32 of the fuse F1 are inserted into the first through hole 40a and the second through hole 40b of the insulating plate 40, respectively. In the first through hole 40a, the first terminal 31 is located inward of the first plating 43. In the second through hole 40b, the second terminal 32 is located inward of the second plating 44. The first terminal 31 is attached to the first plating 43 with solder H. The solder H is conductive. The first terminal 31 is electrically connected to the first conductive pattern 41 via the first plating 43. The second terminal 32 is attached to the second plating 44 with solder H. The second terminal 32 is electrically connected to the second conductive pattern 42 via the second plating 44. The upper sides of the insulating plate 40, the first plating 43, and the second plating 44 are covered with a resist 45, which is insulative.

The first terminal 31 and the second terminal 32 are an upstream end and a downstream end of the fuse F1, respectively. Current flows from the positive electrode of the DC power supply 10 to the first conductive pattern 41, the first terminal 31, the fusing portion, the second terminal 32, the second conductive pattern 42, and the load E1 in this order.

As described above, the first terminal 31 and the second terminal 32 of the fuse F1 are each attached to the substrate B with solder H. Therefore, if the fuse F1 blows, the substrate B is replaced. The fuse F1 is a mechanical fuse. An example of the fuse F1 is a blade fuse. In this case, the first terminal 31 and the second terminal 32 each have a flat plate shape. The fuse F1 may be any kind of fuse as long as it can be attached to the substrate B with the solder H. Therefore, the fuse F1 may be a chip fuse, a thermal fuse, a fusible link, or the like.

Configuration of Blown Fuse Detection Circuit 20

As shown in FIG. 1, the blown fuse detection circuit 20 includes a detection switch 50, a first detection resistor 51, a second detection resistor 52, and a third detection resistor 53. The detection switch 50 is a PNP bipolar transistor. The emitter of the detection switch 50 is connected to the upstream node of the fuse F1. The base of the detection switch 50 is connected to one end of the first detection resistor 51. The other end of the first detection resistor 51 is connected to the downstream node of the fuse F1.

The collector of the detection switch 50 is connected to one end of the second detection resistor 52. The other end of the second detection resistor 52 is connected to one end of the third detection resistor 53. The other end of the third detection resistor 53 is grounded. The connection node between the second detection resistor 52 and the third detection resistor 53 is connected to the microcomputer 21.

In this configuration of the ECU 11, the voltage of the emitter of the detection switch 50 with reference to the potential of its base is invariably higher than or equal to zero V. If the voltage between the emitter and the base of the detection switch 50 is lower than a certain detection threshold value, the detection switch 50 is off. If the detection switch 50 is off, the resistance value between the emitter and the collector of the detection switch 50 is sufficiently large, and therefore no current flows through the emitter and the collector of the detection switch 50.

If the voltage between the emitter and the base of the detection switch 50 is higher than or equal to the detection threshold value, the detection switch 50 is on. If the detection switch 50 is on, the resistance value between the emitter and the collector of the detection switch 50 is sufficiently small, and therefore current does flow through the emitter and the collector of the detection switch 50.

If the detection switch 50 is on, current flows from the upstream node on the current path to the detection switch 50, the second detection resistor 52, and the third detection resistor 53 in this order. The path of the current flowing from the upstream node through the detection switch 50, the second detection resistor 52, and the third detection resistor 53 serves as a second current path. Therefore, the detection switch 50 is positioned on the second current path. In the second current path, the second detection resistor 52 is located downstream of the detection switch 50. In the second current path, the third detection resistor 53 is located downstream of the second detection resistor 52. The detection switch 50, the second detection resistor 52, and the third detection resistor 53 serve as a circuit switch, a second circuit resistor, and a circuit resistor, respectively.

The voltage at the connection node between the second detection resistor 52 and the third detection resistor 53 is output from the blown fuse detection circuit 20 to the microcomputer 21. The connection node between the second detection resistor 52 and the third detection resistor 53 is located upstream of the third detection resistor 53 in the second current path. The voltage at the connection node between the second detection resistor 52 and the third detection resistor 53 is the voltage across the third detection resistor 53.

The detection threshold value is 0.6 V, for example, and is a positive voltage. If the fuse F1 has not blown, the fuse voltage is substantially zero V, as mentioned above. Therefore, the voltage between the emitter and the base of the detection switch 50 is substantially zero V, which is lower than the detection threshold value. If the fuse F1 has not blown, the detection switch 50 is off. If the detection switch 50 is off, no current flows through the second detection resistor 52 and the third detection resistor 53. Therefore, if the fuse F1 has not blown, the blown fuse detection circuit 20 outputs zero V to the microcomputer 21 as an output voltage.

Hereinafter, the upstream voltage of the fuse F1 is represented as Vu. The upstream voltage Vu is the power supply voltage of the DC power supply 10. The voltage between the emitter and the base of the detection switch 50 is represented as Vbe1. The resistance value of the load E1 and the resistance value of the first detection resistor 51 are represented as Re1 and R51, respectively. The downstream voltage of the fuse F1 is represented as Vn. The downstream voltage Vn when the fuse F1 has blown is expressed by the following formula. In the formula, " " represents a product.

$$Vn = (Vu - Vbe1) \cdot Re1/(R51 + Re1)$$

(Vu−Vbe1) is a positive value. Therefore, the greater the resistance value R51, the lower the downstream voltage Vn. The lower the downstream voltage Vn, the higher the voltage Vbe1 between the emitter and the base of the detection switch 50. The resistance value R51 is sufficiently large. Therefore, if the fuse F1 blows, the voltage Vbe1 between the emitter and the base of the detection switch 50 is higher than or equal to the detection threshold value. If the fuse F1 has not blown, the detection switch 50 is on. In the detection switch 50, the fuse voltage when the voltage Vbe1 between the emitter and the base is the detection threshold value is the voltage threshold value.

If the fuse voltage is lower than the voltage threshold value, the detection switch 50 is off. If the fuse voltage increases to a voltage higher than or equal to the voltage threshold value, the detection switch 50 switches from off to on. If the detection switch 50 is on, the second detection resistor 52 and the third detection resistor 53 divide the upstream voltage of the fuse F1, i.e. the power supply voltage of the DC power supply 10. If the detection switch 50 is on, the voltage divided by the second detection resistor 52 and the third detection resistor 53 is output from the blown fuse detection circuit 20 to the microcomputer 21 as an output voltage. The reference voltage is higher than zero V and is lower than or equal to the voltage divided by the second detection resistor 52 and the third detection resistor 53.

The output voltage of the blown fuse detection circuit 20 is determined by the resistance values of the second detection resistor 52 and the third detection resistor 53. The resistance value of the second detection resistor 52 and the resistance value of the third detection resistor 53 are represented as R52 and R53, respectively. The larger R53/(R52+ R53), the higher the output voltage of the blown fuse detection circuit 20. By adjusting the resistance values of the second detection resistor 52 and the third detection resistor 53, it is possible to adjust the output voltage of the blown fuse detection circuit 20 when the detection switch 50 is on.

The upper limit of the permissible range of the voltage output to the microcomputer 21 is 5 V, 3.3 V, etc. The power supply voltage of the DC power supply 10 is 12 V, for example. The upper limit of the permissible range of the voltage output to the microcomputer 21 is lower than the upstream voltage of the fuse F1. The resistance values of the second detection resistor 52 and the third detection resistor 53 are such that the output voltage of the blown fuse detection circuit 20 is lower than or equal to the upper limit of the permissible range.

Operation of Blown Fuse Detection Circuit 20

Figure 4:
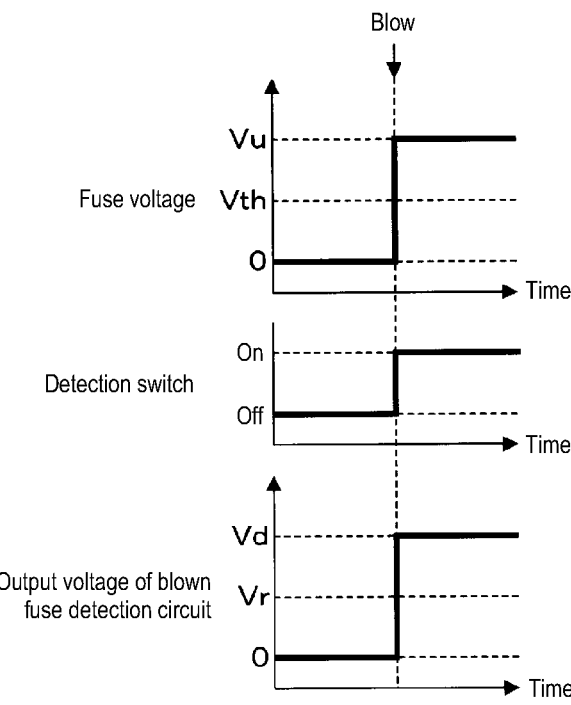
FIG. 4 is a timing chart illustrating operation of a blown fuse detection circuit.

FIG. 4 is a timing chart illustrating the operation of the blown fuse detection circuit 20. FIG. 4 shows the respective transitions of the fuse voltage, the state of the detection switch 50, and the output voltage of the blown fuse detection circuit 20. The horizontal axis of each transition indicates time. As described above, the upstream voltage of the fuse F1 is represented as Vu. The voltage threshold value and the reference voltage are represented as Vth and Vr, respectively. The divided voltage obtained by the second detection resistor 52 and the third detection resistor 53 dividing the upstream voltage Vu is represented as Vd.

If the fuse F1 has not blown, the fuse voltage is substantially zero V, as mentioned above, which is lower than the voltage threshold value Vth. Therefore, the detection switch 50 is off. Therefore, the blown fuse detection circuit 20 outputs zero V, i.e. a voltage lower than the reference voltage Vr, to the microcomputer 21. If the fuse F1 blows, as mentioned above, the downstream voltage of the fuse F1 decreases while the upstream voltage of the fuse F1 is maintained at the upstream voltage Vu. At this time, the downstream voltage of the fuse F1 is substantially zero V. If the downstream voltage decreases, the fuse voltage increases. At this time, the fuse voltage is substantially the upstream voltage Vu. The upstream voltage Vu is higher than or equal to the voltage threshold value Vth.

Therefore, if the fuse F1 blows, the detection switch 50 is switched from off to on. If the detection switch 50 is on, current flows from the positive electrode of the DC power supply 10 through the second current path on which the detection switch 50, the second detection resistor 52, and the third detection resistor 53 are arranged. The second detection resistor 52 and the third detection resistor 53 divide the upstream voltage Vu. The output voltage of the blown fuse detection circuit 20 increases from zero V to the divided voltage Vd, which is higher than or equal to the reference voltage Vr. If the output voltage of the blown fuse detection circuit 20 is higher than or equal to the reference voltage Vr, the microcomputer 21 provides information indicating that the fuse F1 has blown.

Effects of ECU 11

In the ECU 11, if the fuse F1 blows, the blown fuse detection circuit 20 outputs a voltage higher than or equal to the reference voltage Vr. The microcomputer 21 provides information indicating that the fuse F1 has blown. Therefore, there is no need for a person to visually check whether or not the fuse F1 has blown. As a result, there is a high degree of freedom regarding the position of the fuse F1, i.e. the position of the substrate B.

Second Embodiment

In the first embodiment, the ECU 11 does not control the power supply from the DC power supply 10 to the load E1. However, the ECU 11 may also control the power supply from the DC power supply 10 to the load E1.

Hereinafter, a second embodiment will be described with respect to the differences from the first embodiment. Components other than those described below are the same as those in the first embodiment, and therefore, the same constituent components as in the first embodiment are given the same reference numerals as in the first embodiment, and the descriptions thereof will be omitted.

Configuration of ECU 11

Figure 5:
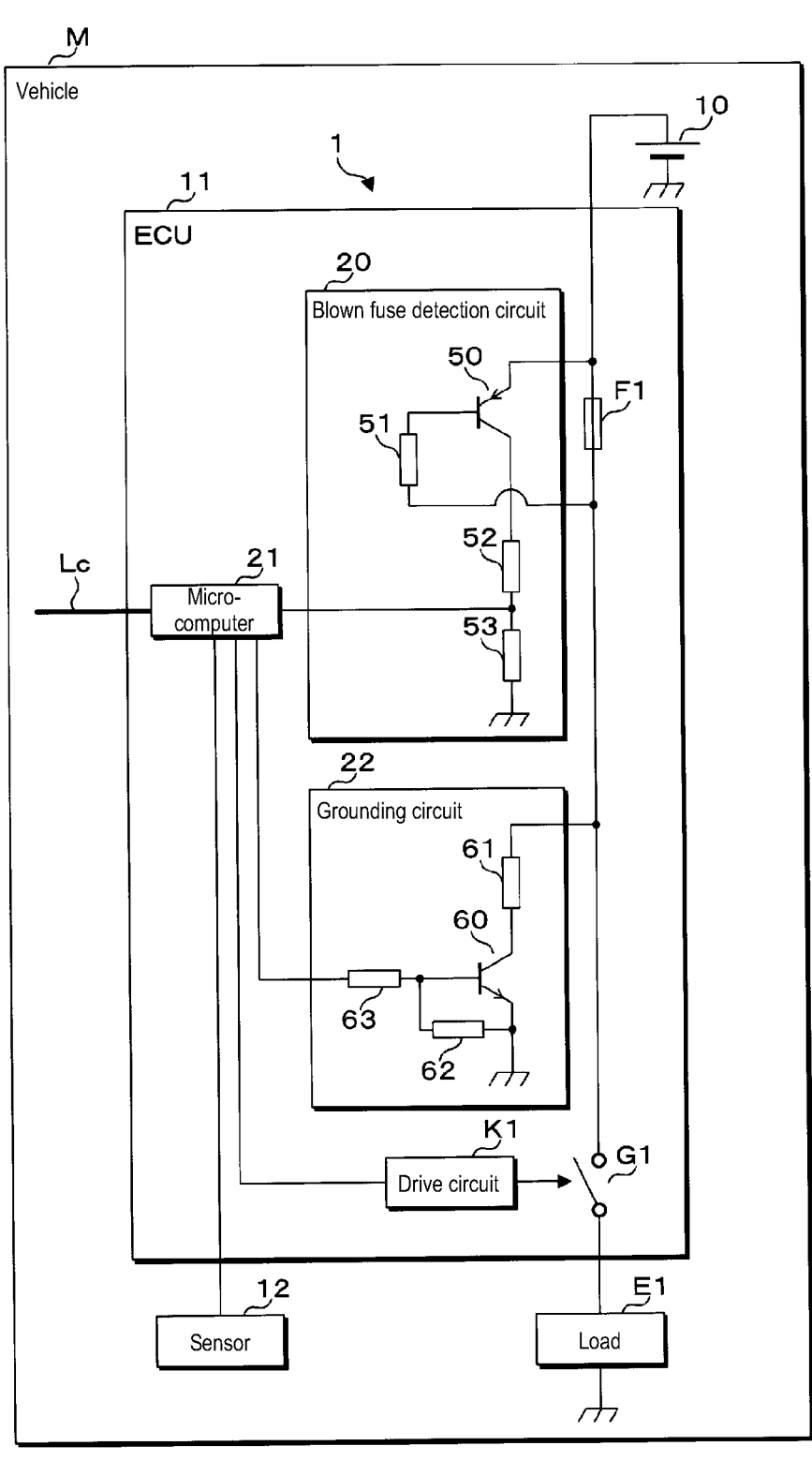
FIG. 5 is a block diagram showing a configuration of a main portion of an ECU according to a second embodiment.

FIG. 5 is a block diagram showing a configuration of a main portion of an ECU 11 according to a second embodiment. When comparing the first and second embodiments, the configurations of the ECUs 11 are different. The ECU 11 according to the second embodiment includes the blown fuse detection circuit 20, the microcomputer 21, and the fuse F1 as in the first embodiment. The ECU 11 according to the second embodiment further includes a grounding circuit 22, a power supply switch G1, and a drive circuit K1.

The power supply switch G1 is connected between the fuse F1 and the load E1. If the power supply switch G1 is on, current flows from the positive electrode of the DC power supply 10 to the fuse F1, the power supply switch G1, and the load E1 in this order. Thus, power is supplied to the load E1. In the second embodiment, in the current path of the current flowing from the DC power supply 10 through the fuse F1, the power supply switch G1 is located downstream of the fuse F1. The power supply switch G1 serves as a downstream switch. In the current path, the power supply switch G1 is located upstream of the load E1. In the second embodiment, the downstream node is the connection node between the fuse F1 and the power supply switch G1.

The grounding circuit 22 is separately connected to the microcomputer 21 and the downstream node. The drive circuit K1 is connected to the microcomputer 21. The microcomputer 21 outputs a high-level voltage and a low-level voltage to the drive circuit K1. The microcomputer 21 switches the voltage output to the drive circuit K1 to the high-level voltage or to the low-level voltage.

If the microcomputer 21 switches the voltage output to the drive circuit K1 from the low-level voltage to the high-level voltage, the drive circuit K1 switches on the power supply switch G1. As described above, if the power supply switch G1 is on, current flows through the load E1 and power is supplied to the load E1. If the microcomputer 21 switches the voltage output to the drive circuit K1 from the high-level voltage to the low-level voltage, the drive circuit K1 switches off the power supply switch G1. If the power supply switch G1 is switched off, the current flow through the load E1 stops. As a result, power supply to the load E1 stops.

The microcomputer 21 determines whether or not the power supply switch G1 is to be switched on or off, based on data received via the communication line Lc or sensor data input from the sensor 12, for example. Upon determining that the power supply switch G1 is to be switched on, the microcomputer 21 switches the voltage output to the drive circuit K1 to the high-level voltage. Upon determining that the power supply switch G1 is to be switched off, the microcomputer 21 switches the voltage output to the drive circuit K1 to the low-level voltage.

It is assumed that the grounding circuit 22 is not provided, the fuse F1 has blown, and the power supply switch G1 is off. In this case, the downstream voltage with reference to the ground potential is unstable. Therefore, it is unclear whether or not the fuse voltage indicates a voltage higher than or equal to the voltage threshold value.

The microcomputer 21 outputs a high-level voltage or a low-level voltage to the grounding circuit 22. The microcomputer 21 switches the voltage output to the grounding circuit 22 to the high-level voltage or to the low-level voltage. The grounding circuit 22 includes a first grounding resistor 61. If the microcomputer 21 switches the voltage output to the grounding circuit 22 from the low-level voltage to the high-level voltage, the grounding circuit 22 grounds the downstream node through the first grounding resistor 61. If the microcomputer 21 switches the voltage output to the grounding circuit 22 from the high-level voltage to the low-level voltage, the grounding circuit 22 releases the grounding through the first grounding resistor 61. If the power supply switch G1 is off and the downstream node is grounded through the first grounding resistor 61, the blown fuse detection circuit 20 operates properly.

Configuration of Grounding Circuit 22

The grounding circuit 22 includes, in addition to the first grounding resistor 61, a grounding switch 60, a second grounding resistor 62, and a third grounding resistor 63. The grounding switch 60 is an NPN bipolar transistor. One end of the first grounding resistor 61 is connected to the downstream node of the fuse F1. The other end of the first grounding resistor 61 is connected to the collector of the grounding switch 60. The emitter of the grounding switch 60 is grounded. The second grounding resistor 62 is connected between the base and the emitter of the grounding switch 60. Furthermore, one end of the third grounding resistor 63 is connected to the base of the grounding switch 60. The other end of the third grounding resistor 63 is connected to the microcomputer 21.

If the voltage between the base and the emitter of the grounding switch 60 is lower than a certain ground threshold value, the grounding switch 60 is off. The ground threshold value is a positive voltage. If the grounding switch 60 is off, the resistance value between the collector and the emitter of the grounding switch 60 is sufficiently large, and therefore no current flows through the emitter and the collector of the grounding switch 60. If the voltage between the base and the emitter of the grounding switch 60 is higher than or equal to the ground threshold value, the grounding switch 60 is on. If the grounding switch 60 is on, the resistance value between the collector and the emitter of the grounding switch 60 is sufficiently small, and therefore current flows through the emitter and the collector of the grounding switch 60.

If the grounding switch 60 is on, current flows from the downstream node of the fuse F1 to the first grounding resistor 61 and the grounding switch 60 in this order. The path of the current flowing from the downstream node on the current path through the first grounding resistor 61 and the grounding switch 60 serves as a third current path. The grounding switch 60 and the first grounding resistor 61 are located on the third current path. The grounding switch 60 and the first grounding resistor 61 serve as a path switch and a path resistor, respectively. If the grounding switch 60 is on, the downstream node of the fuse F1 is grounded through the first grounding resistor 61. If the grounding switch 60 is switched from on to off, the grounding of the downstream node through the first grounding resistor 61 is released.

The referential potential for the high-level voltage and the low-level voltage output by the microcomputer 21 is the ground potential. The low-level voltage output by the microcomputer 21 is zero V. The high-level voltage output by the microcomputer 21 is a positive voltage.

If the voltage output by the microcomputer 21 to the grounding circuit 22 is the low-level voltage, no current flows through the second grounding resistor 62. Therefore, the voltage between the base and the emitter of the grounding switch 60 is zero V, which is lower than the ground threshold value. Therefore, if the microcomputer 21 has output the low-level voltage to the grounding circuit 22, the grounding switch 60 is off.

If the voltage output by the microcomputer 21 to the grounding circuit 22 is the high-level voltage, current flows through the third grounding resistor 63 and the second grounding resistor 62 in this order. Therefore, a voltage drop occurs in the second grounding resistor 62. At this time, the voltage between the base and the emitter of the grounding switch 60 is higher than zero V. If the voltage output by the microcomputer 21 to the grounding circuit 22 is the high-level voltage, the voltage between the base and the emitter of the grounding switch 60 is higher than or equal to the ground threshold value, and the grounding switch 60 is on. As described above, the microcomputer 21 switches the grounding switch 60 on or off by switching the voltage output to the grounding circuit 22 to the high-level voltage or to the low-level voltage.

Operation of Microcomputer 21

If the power supply switch G1 is on, the blown fuse detection circuit 20 operates properly as in the first embodiment. Therefore, if the power supply switch G1 is on, the microcomputer 21 determines whether or not the fuse F1 has blown, based on the output voltage of the blown fuse detection circuit 20, while maintaining the voltage output to the grounding circuit 22 at the low-level voltage.

If the power supply switch G1 is off, the microcomputer 21 switches on the grounding switch 60. In the state where the grounding switch 60 is on, the microcomputer 21 determines whether or not the fuse F1 has blown, based on the voltage output from the blown fuse detection circuit 20. As in the first embodiment, if the output voltage of the blown fuse detection circuit 20 is higher than or equal to the reference voltage, the microcomputer 21 determines that the fuse F1 has blown. If the output voltage of the blown fuse detection circuit 20 is lower than the reference voltage, the microcomputer 21 determines that the fuse F1 has not blown.

Circuit Design

As described in the description of the first embodiment, the upstream voltage and the downstream voltage of the fuse F1 are represented as Vu and Vn, respectively. The voltage between the emitter and the base of the detection switch 50 is represented as Vbe1. The resistance value of the load E1 and the resistance value of the first detection resistor 51 are represented as Re1 and R51, respectively. In the second embodiment, the resistance value of the first grounding resistor 61 is represented as R61. The voltage between the collector and the emitter of the grounding switch 60 when the grounding switch 60 is on is represented as Vce2. In the state where the fuse F1 has blown, if the grounding switch 60 is on and the power supply switch G1 is off, the downstream voltage Vn is expressed by the following formula.

$$Vn = \big((Vu - Vbe1 - Vce2) \cdot R61/(R51 + R61)\big) + Vce2$$

(Vu−Vbe1−Vce2) is a positive value. Therefore, the greater the resistance value R51, the lower the downstream voltage Vn. The smaller the resistance value R61, the lower the downstream voltage Vn. The lower the downstream voltage Vn, the higher the voltage Vbe1 between the emitter and the base of the detection switch 50. The resistance value R51 is sufficiently large. The resistance value R61 is relatively small. Therefore, if the fuse F1 blows, the voltage Vbe1 between the emitter and the base of the detection switch 50 is higher than or equal to the detection threshold value. Therefore, if the power supply switch G1 is off, the blown fuse detection circuit 20 is enabled to operate properly by switching on the grounding switch 60.

Effects of ECU 11

The ECU 11 according to the second embodiment achieves the same effects as those achieved by the ECU 11 according to the first embodiment. In the ECU 11 according to the second embodiment, if the power supply switch G1 is off, the grounding switch 60 is switched on. Thus, the downstream node of the fuse F1 is grounded through the first grounding resistor 61. As a result, the blown fuse detection circuit 20 operates properly.

Third Embodiment

In the second embodiment, one switch (the power supply switch G1) is provided in the current path. However, the number of switches provided in the current path is not limited to one.

Hereinafter, a third embodiment will be described with respect to the differences from the second embodiment. Components other than those described below are the same as those in the second embodiment, and therefore, the same constituent components as in the second embodiment are given the same reference numerals as in the second embodiment, and the descriptions thereof will be omitted.

Configuration of Power Supply System 1

Figure 6:
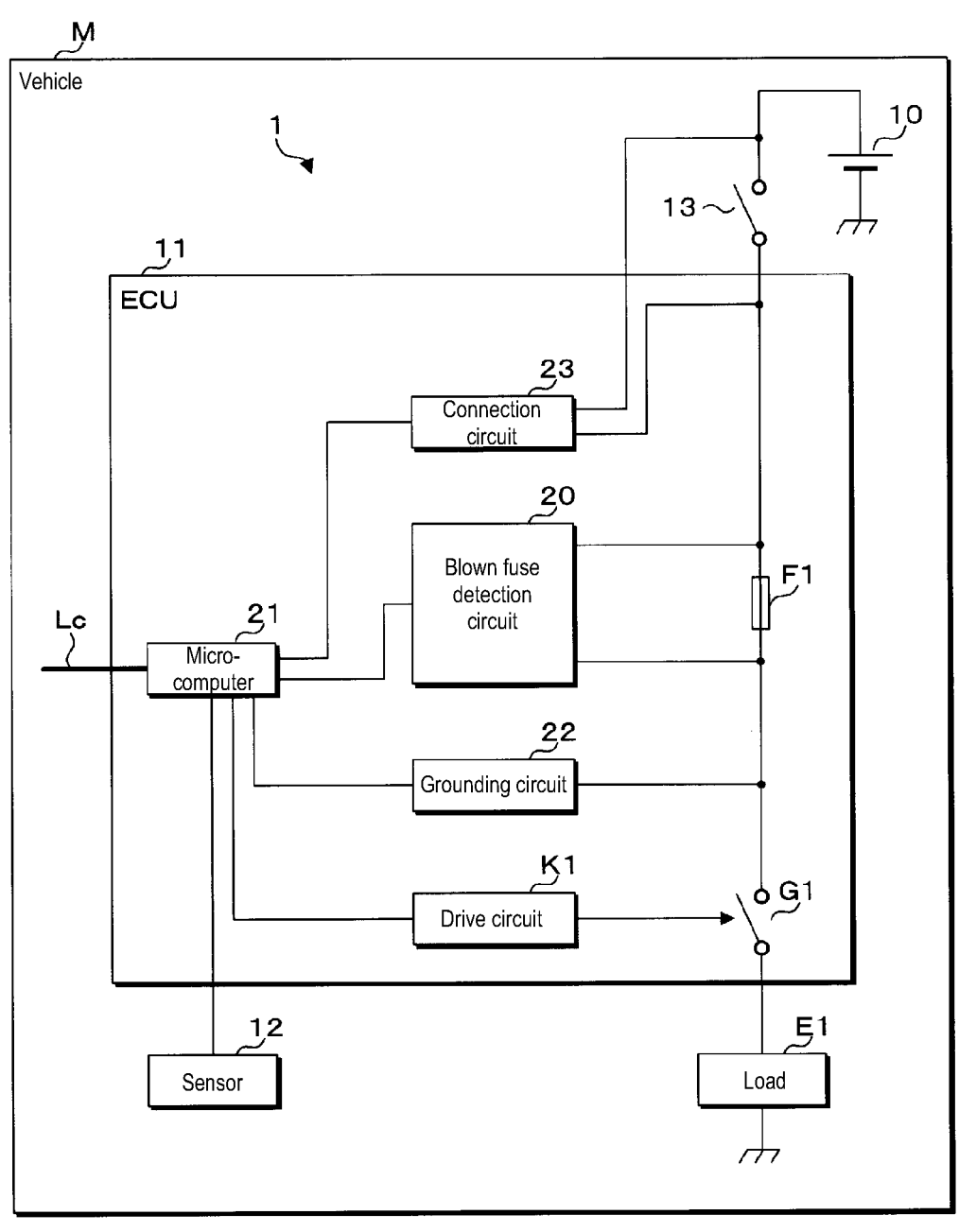
FIG. 6 is a block diagram showing a configuration of a main portion of a power supply system according to a third embodiment.

FIG. 6 is a block diagram showing a configuration of a main portion of a power supply system 1 according to the third embodiment. The power supply system 1 according to the third embodiment includes the same constituent components as in the power supply system 1 according to the second embodiment. The power supply system 1 according to the third embodiment further includes an upstream switch 13.

The upstream switch 13 is connected between the positive electrode of the DC power supply 10 and the fuse F1. If the upstream switch 13 and the power supply switch G1 are on, current flows from the positive electrode of the DC power supply 10 to the upstream switch 13, the fuse F1, the power supply switch G1, and the load E1 in this order. Thus, power is supplied to the load E1. In the third embodiment, in the current path of the current flowing from the positive electrode of the DC power supply 10 through the fuse F1, the upstream switch 13 is located upstream of the fuse F1. In the third embodiment, the upstream node is a connection node between the DC power supply 10 and the fuse F1.

If at least either the upstream switch 13 or the power supply switch G1 is off, no current flows through the current path. Therefore, no power is supplied to the load E1. The upstream switch 13 is switched on or off by a drive circuit (not shown). The upstream switch 13 is, for example, an ignition switch for the vehicle M.

Configuration of ECU 11

The ECU 11 according to the third embodiment achieves the same effects as those achieved by the ECU 11 according to the second embodiment. The ECU 11 according to the third embodiment further includes a connection circuit 23. The connection circuit 23 is connected to both ends of the upstream switch 13. The connection circuit 23 is further connected to the microcomputer 21.

The microcomputer 21 outputs a high-level voltage or a low-level voltage to the connection circuit 23. The microcomputer 21 switches the voltage output to the connection circuit 23 to the high-level voltage or to the low-level voltage. If the microcomputer 21 switches the voltage output to the connection circuit 23 from the low-level voltage to the high-level voltage, the connection circuit 23 electrically connects the two ends of the upstream switch 13 via a first connection resistor 71 (see FIG. 7). If the microcomputer 21 switches the voltage output to the connection circuit 23 from the high-level voltage to the low-level voltage, the connection circuit 23 interrupts the electrical connection via the first connection resistor 71.

If the upstream switch 13 and the power supply switch G1 are off, the microcomputer 21 switches the voltages output to the grounding circuit 22 and the connection circuit 23 from the low-level voltage to the high-level voltage. Thus, the grounding circuit 22 grounds the downstream node of the fuse F1 through the first grounding resistor 61. The connection circuit 23 electrically connects the two ends of the upstream switch 13 via the first connection resistor 71. Due to the operations of the grounding circuit 22 and the connection circuit 23, the blown fuse detection circuit 20 operates properly. As in the second embodiment, the microcomputer 21 determines whether or not the fuse F1 has blown, based on the output voltage of the blown fuse detection circuit 20.

If the upstream switch 13 is off and the power supply switch G1 is on, the microcomputer 21 switches the voltage output to the connection circuit 23 from the low-level voltage to the high-level voltage. Thus, the connection circuit 23 electrically connects the two ends of the upstream switch 13 via the first connection resistor 71. Due to the operation of the connection circuit 23, the blown fuse detection circuit 20 operates properly. As in the second embodiment, the microcomputer 21 determines whether or not the fuse F1 has blown, based on the output voltage of the blown fuse detection circuit 20.

If the two ends of the upstream switch 13 are connected via the first connection resistor 71 while the power supply switch G1 is on, current flows from the positive electrode of the DC power supply 10 to the first connection resistor 71, the fuse F1, the power supply switch G1, and the load E1 in this order. Since current flows through the first connection resistor 71, the current value of the current flowing to the load E1 through the fuse F1 is kept low. If current flows through the first connection resistor 71, the fuse F1, the power supply switch G1, and the load E1 in this order, the voltage applied to the load E1 decreases as the resistance value of the first connection resistor 71 increases. If the voltage applied to the load E1 is higher than or equal to a certain operating voltage, the load E1 can operate. If the voltage applied to the load E1 is lower than the operating voltage, the load E1 has stopped operating.

If the two ends of the upstream switch 13 are connected via the first connection resistor 71 while the power supply switch G1 is on, the resistance value of the first connection resistor 71 is adjusted so that the voltage applied to the load E1 is lower than the operating voltage. Therefore, the microcomputer 21 can detect that the fuse F1 has blown, without operating the load E1. If the upstream switch 13 and the power supply switch G1 are on, the power supply voltage of the DC power supply 10 is applied to the load E1. The power supply voltage is higher than or equal to the operating voltage.

Configuration of Connection Circuit 23

Figure 7:
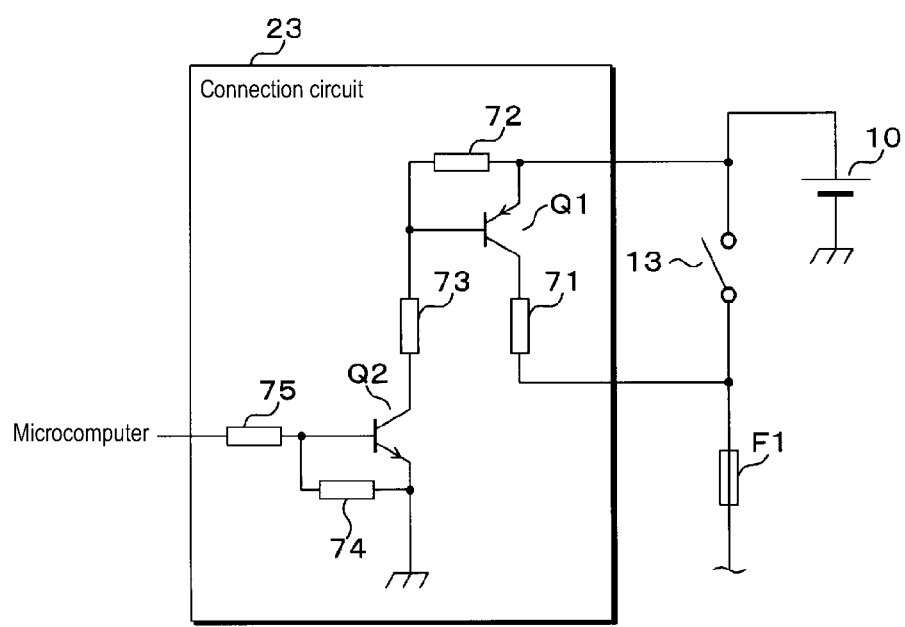
FIG. 7 is a circuit diagram for a connection circuit.

FIG. 7 is a circuit diagram for the connection circuit 23. The connection circuit 23 includes the first connection resistor 71, a second connection resistor 72, a third connection resistor 73, a fourth connection resistor 74, a fifth connection resistor 75, a first connection switch Q1, and a second connection switch Q2. The first connection switch Q1 is a PNP bipolar transistor. The second connection switch Q2 is an NPN bipolar transistor.

The emitter of the first connection switch Q1 is connected to an upstream end of the upstream switch 13. The collector of the first connection switch Q1 is connected to one end of the first connection resistor 71. The other end of the first connection resistor 71 is connected to a downstream end of the upstream switch 13.

As described above, the first connection resistor 71 is connected in series to the first connection switch Q1. The series circuit including the first connection resistor 71 and the first connection switch Q1 is connected between the two ends of the upstream switch 13. The first connection resistor 71 and the first connection switch Q1 serve as a device resistor and a device switch, respectively. The second connection resistor 72 is connected between the emitter and the base of the first connection switch Q1. The base of the first connection switch Q1 is further connected to one end of the third connection resistor 73. The other end of the third connection resistor 73 is connected to the collector of the second connection switch Q2. The emitter of the second connection switch Q2 is grounded. The fourth connection resistor 74 is connected between the base and the emitter of the second connection switch Q2. The base of the second connection switch Q2 is further connected to one end of the fifth connection resistor 75. The other end of the fifth connection resistor 75 is connected to the microcomputer 21.

In the configuration of the ECU 11, the voltage of the emitter of the first connection switch Q1 with reference to the potential of its base is invariably higher than or equal to zero V. If the voltage between the emitter and the base of the first connection switch Q1 is lower than a certain first connection threshold value, the first connection switch Q1 is off. The first connection threshold value is a positive value. If the first connection switch Q1 is off, the resistance value between the emitter and the collector of the first connection switch Q1 is sufficiently large, and therefore no current flows through the emitter and the collector of the first connection switch Q1.

If the voltage between the emitter and the base of the first connection switch Q1 is higher than or equal to the first connection threshold value, the first connection switch Q1 is on. If the first connection switch Q1 is on, the resistance value between the emitter and the collector of the first connection switch Q1 is sufficiently small, and therefore current flows through the emitter and the collector of the first connection switch Q1.

If the voltage between the base and the emitter of the second connection switch Q2 is lower than a certain second connection threshold value, the second connection switch Q2 is off. The second connection threshold value is a positive voltage value. If the second connection switch Q2 is off, the resistance value between the collector and the emitter of the second connection switch Q2 is sufficiently large, and therefore no current flows through the emitter and the collector of the second connection switch Q2. If the voltage between the base and the emitter of the second connection switch Q2 is higher than or equal to the second connection threshold value, the second connection switch Q2 is on. If the second connection switch Q2 is on, the resistance value between the collector and the emitter of the second connection switch Q2 is sufficiently small, and therefore current flows through the emitter and the collector of the second connection switch Q2.

If the voltage output by the microcomputer 21 to the connection circuit 23 is the low-level voltage, no current flows through the fourth connection resistor 74. Therefore, the voltage between the base and the emitter of the second connection switch Q2 is zero V, which is lower than the second connection threshold value. Therefore, if the microcomputer 21 has output the low-level voltage to the connection circuit 23, the second connection switch Q2 is off.

If the second connection switch Q2 is off, no current flows through the second connection resistor 7 2. Therefore, the voltage between the base and the emitter of the first connection switch Q1 is zero V, which is lower than the first connection threshold value. Therefore, if the second connection switch Q2 is off, the first connection switch Q1 is off. As a result, if the microcomputer 21 has output the low-level voltage to the connection circuit 23, the first connection switch Q1 is off.

If the voltage output by the microcomputer 21 to the connection circuit 23 is the high-level voltage, current flows through the fifth connection resistor 75 and the fourth connection resistor 74 in this order. Therefore, a voltage drop occurs in the fourth connection resistor 74. At this time, the voltage between the base and the emitter of the second connection switch Q2 is higher than zero V. If the voltage output by the microcomputer 21 to the connection circuit 23 is the high-level voltage, the voltage between the base and the emitter of the second connection switch Q2 is higher than or equal to the second connection threshold value, and the second connection switch Q2 is on.

If the second connection switch Q2 is on, current flows from the positive electrode of the DC power supply 10 to the second connection resistor 72, the third connection resistor 73, and the second connection switch Q2 in this order. Therefore, a voltage drop occurs in the second connection resistor 72. At this time, the voltage between the base and the emitter of the first connection switch Q1 is higher than zero V. If the second connection switch Q2 is on, the first connection switch Q1 is on. As a result, if the microcomputer 21 has output the high-level voltage to the connection circuit 23, the first connection switch Q1 is on.

As described above, the microcomputer 21 switches the first connection switch Q1 on or off by switching the voltage output to the connection circuit 23 to the high-level voltage or to the low-level voltage. If the first connection switch Q1 is switched from off to on, the two ends of the upstream switch 13 are electrically connected via the first connection resistor 71. If the first connection switch Q1 is switched from on to off, the electrical connection via the first connection resistor 71 is interrupted.

Operation of Microcomputer 21

If the upstream switch 13 is on, the configuration of the power supply system 1 according to the third embodiment is the same as the configuration of the power supply system 1 according to the second embodiment. Therefore, if the upstream switch 13 is on, the microcomputer 21 operates in the same manner as in the second embodiment.

In the case where the upstream switch 13 is off, if the power supply switch G1 is off, the microcomputer 21 first switches on the grounding switch 60 of the grounding circuit 22. Next, the microcomputer 21 switches on the first connection switch Q1 of the connection circuit 23. In the state where the grounding switch 60 and the first connection switch Q1 are on, as in the second embodiment, the microcomputer 21 determines whether or not the fuse F1 has blown, based on the voltage output from the blown fuse detection circuit 20. In the case where the upstream switch 13 is off, if the power supply switch G1 is on, the microcomputer 21 switches on the first connection switch Q1 of the connection circuit 23. In the state where the first connection switch Q1 is on, as in the second embodiment, the microcomputer 21 determines whether or not the fuse F1 has blown, based on the voltage output from the blown fuse detection circuit 20.

In the state where the upstream switch 13 is off, if the first connection switch Q1 is on, the upstream voltage, which is the voltage at the upstream node of the fuse F1, is lower than the power supply voltage of the DC power supply 10 due to the operation of the first connection resistor 71. However, if the resistance value R51 of the first detection resistor 51 of the blown fuse detection circuit 20 is sufficiently large, the blown fuse detection circuit 20 operates properly as in the case where the upstream switch 13 is on.

Effects of ECU 11

The ECU 11 according to the third embodiment achieves the same effects as those achieved by the ECU 11 according to the second embodiment.

Modifications of Third Embodiment

In the third embodiment, the upstream switch 13 may be located within the ECU 11. In addition, as in the first embodiment, the downstream end of the fuse F1 may be connected directly to one end of the load E1. If this is the case, the grounding circuit 22 and the power supply switch G1 are unnecessary. The microcomputer 21 operates in the same manner as when the power supply switch G1 is on.

Fourth Embodiment

In the first embodiment, the number of loads connected to the ECU 11 is one. However, the number of loads connected to the ECU 11 may be two or more. Hereinafter, a fourth embodiment will be described with respect to the differences from the first embodiment. Components other than those described below are the same as those in the first embodiment, and therefore, the same constituent components as in the first embodiment are given the same reference numerals as in the first embodiment, and the descriptions thereof will be omitted.

Configuration of Power Supply System 1

Figure 8:
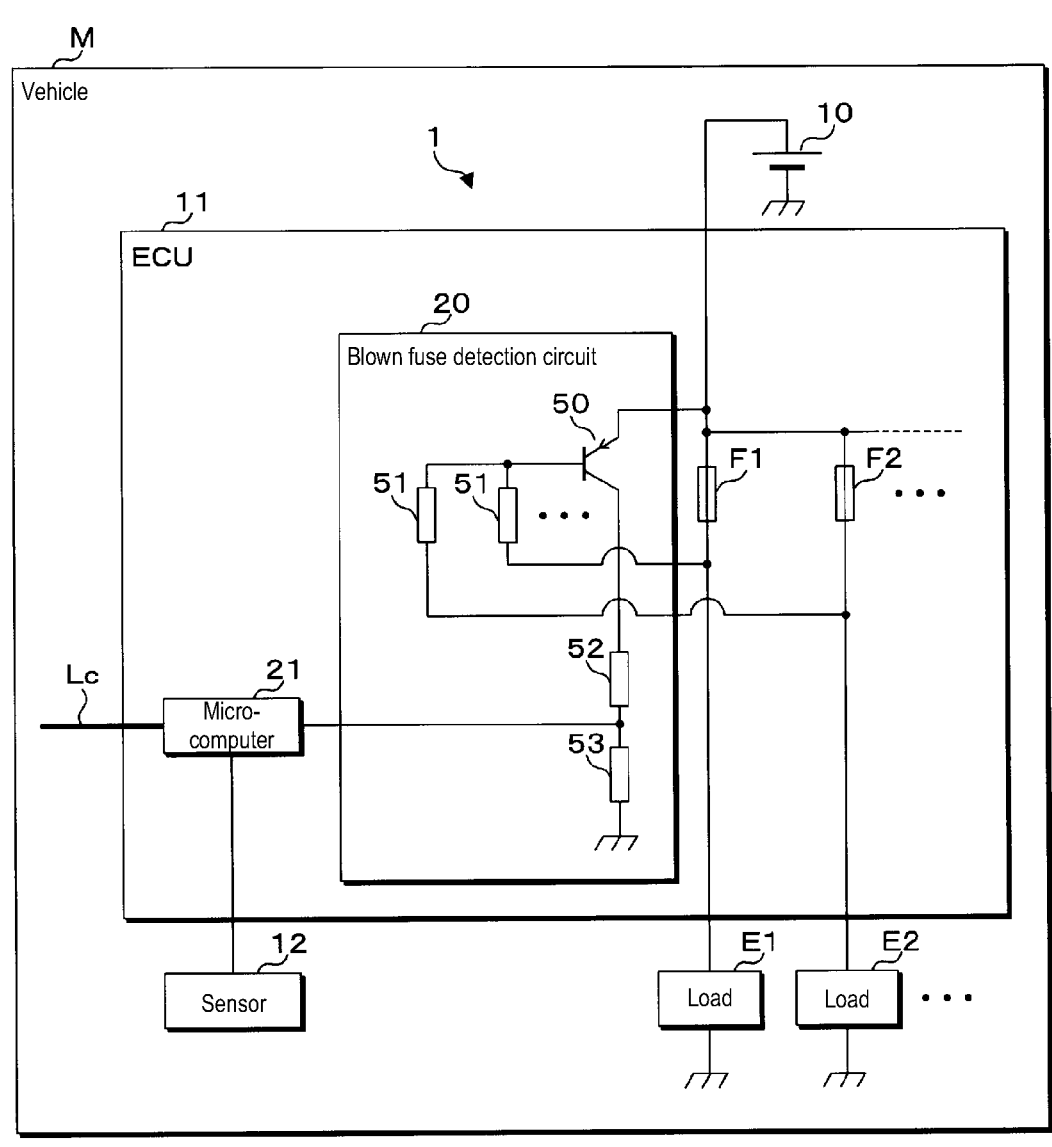
FIG. 8 is a block diagram showing a configuration of a main portion of a power supply system according to a fourth embodiment.

FIG. 8 is a block diagram showing a configuration of a main portion of a power supply system 1 according to the fourth embodiment. As in the first embodiment, the power supply system 1 includes the DC power supply 10, the ECU 11, and the sensor 12. The power supply system 1 further includes a plurality of loads E1, E2, and so on. The loads E1, E2, and so on are electrical devices. The ECU 11 includes the blown fuse detection circuit 20 and the microcomputer 21 as in the first embodiment. The ECU 11 further includes plurality of fuses F1, F2, and so on.

Hereinafter, a given natural number is represented as i. The natural number i may be any one of 1, 2, and so on. One end of the fuse Fi is connected to the positive electrode of the DC power supply 10. The other end of the fuse Fi is connected to one end of the load Ei. The other end of the load Ei is grounded. Current flows from the positive electrode of the DC power supply 10 to the fuse Fi and the load Ei in this order. Thus, power is supplied to the load Ei. Therefore, the plurality of currents flowing from the positive terminal of the DC power supply 10 respectively flow through the plurality of fuses F1, F2, and so on.

Hereinafter, the path of the current flowing from the positive electrode of the DC power supply 10 via the fuse Fi is referred to as "current path of the fuse Fi". In the current paths of the fuses F1, F2, and so on, the section located upstream of the fuses F1, F2, and so on is shared among them. In the fourth embodiment, the common connection node located upstream of the fuses F1, F2, and so on is referred to as "upstream node". In the current path of the fuse Fi, a connection node located downstream of the fuse Fi is referred to as "downstream node of the fuse Fi". The upstream node is located downstream of the DC power supply 10. The downstream node of the fuse Fi is located upstream of the load Ei.

The fuse Fi operates in the same manner as the fuse F1 according to the first embodiment. Therefore, if a current having a current value greater than or equal to a certain value flows through the fuse Fi, the fuse Fi blows. Thus, overcurrent is prevented from flowing through the load Ei.

As in the first embodiment, the voltage at the upstream node and the voltage at the downstream node with reference to the reference potential are referred to as "upstream voltage" and "downstream voltage", respectively. The voltage between the upstream node and the downstream node of the fuse Fi is referred to as "fuse voltage of the fuse Fi". The fuse voltage of the fuse Fi is calculated by subtracting the downstream voltage of the fuse Fi from the upstream voltage.

The blown fuse detection circuit 20 is connected to the upstream node, and the downstream node of the fuse Fi. The blown fuse detection circuit 20 monitors the fuse voltages of all the fuses F1, F2, and so on. If the fuse Fi has not blown, the fuse voltage of the fuse Fi is lower than the voltage threshold value. If the fuse voltages of all the fuses F1, F2, and so on are lower than the voltage threshold value, the blown fuse detection circuit 20 outputs a voltage lower than the reference voltage to the microcomputer 21.

If the fuse Fi has blown, the fuse voltage of the fuse Fi is higher than or equal to the voltage threshold value. If at least one of the fuse voltages of the plurality of fuses F1, F2, and so on is higher than or equal to the voltage threshold value, the blown fuse detection circuit 20 outputs a voltage higher than or equal to the reference voltage to the microcomputer 21. Therefore, if at least one of the fuse voltages of the plurality of fuses F1, F2, and so on increases to a voltage higher than or equal to the voltage threshold value, the blown fuse detection circuit 20 detects that at least one of the plurality of fuses F1, F2, and so on has blown.

Installation of Plurality of Fuses F1, F2, etc.

The fuse Fi is configured in the same manner as the fuse F1 according to the first embodiment. The first terminal 31 and the second terminal 32 of each of the plurality of fuses F1, F2, and so on are attached to a common substrate B with solder H, as with the first terminal 31 and the second terminal 32 of the fuse F1 according to the first embodiment. Therefore, if at least one of the plurality of fuses F1, F2, and so on blows, the substrate B is replaced.

Configuration of Blown Fuse Detection Circuit 20

In the fourth embodiment, the emitter of the detection switch 50 is connected to the common upstream node of the plurality of fuses F1, F2, and so on. The blown fuse detection circuit 20 according to the fourth embodiment includes a plurality of first detection resistors 51. The number of first detection resistors 51 is the same as the number of fuses F1, F2, and so on. One end of each of the first detection resistors 51 is connected to the base of the detection switch 50 as in the first embodiment. The other end of each of the first detection resistors 51 is connected to the downstream node of the corresponding fuse of the plurality of fuses F1, F2, and so on.

If none of the fuses F1, F2, and so on have blown, the voltage between the emitter and the base of the detection switch 50 is lower than the detection threshold value. Therefore, the detection switch 50 is off. As a result, the blown fuse detection circuit 20 outputs zero V, i.e. a voltage lower than the reference voltage, to the microcomputer 21.

If at least one of the plurality of fuses F1, F2, and so on has blown, the downstream voltage of the blown fuse decreases. Accordingly, the voltage of the base of the detection switch 50 with reference to the ground potential decreases. As a result, the voltage between the base and the emitter of the detection switch 50 increases to a voltage higher than or equal to the detection threshold value. If the voltage between the base and the emitter of the detection switch 50 increases to a voltage higher than or equal to the detection threshold value, the detection switch 50 is switched on. If the detection switch 50 is on, as in the first embodiment, the blown fuse detection circuit 20 outputs a voltage higher than or equal to the reference voltage to the microcomputer 21.

The resistance value R51 of each of the plurality of first detection resistor 51 is sufficiently large. Therefore, if any of the plurality of fuses F1, F2, and so on has blown, the detection switch 50 is switched from off to on.

The microcomputer 21 determines whether or not at least one of the plurality of fuses F1, F2, and so on has blown, based on the output voltage of the blown fuse detection circuit 20. If the output voltage of the blown fuse detection circuit 20 is lower than the reference voltage, the microcomputer 21 determines that none of the fuses F1, F2, and so on has blown. If the output voltage of the blown fuse detection circuit 20 is higher than or equal to the reference voltage, the microcomputer 21 determines that at least one of the plurality of fuses F1, F2, and so on has blown.

Effects of ECU 11

The ECU 11 according to the fourth embodiment achieves the same effects as those achieved by the ECU 11 according to the first embodiment.

Fifth Embodiment

In the fourth embodiment, the ECU 11 does not control the power supply from the DC power supply 10 to the plurality of loads E1, E2, and so on. However, the ECU 11 may also control the power supply from the DC power supply 10 to the plurality of loads E1, E2, and so on.

Hereinafter, a fifth embodiment will be described with respect to the differences from the fourth embodiment. Components other than those described below are the same as those in the fourth embodiment, and therefore, the same constituent components as in the fourth embodiment are given the same reference numerals as in the fourth embodiment, and the descriptions thereof will be omitted. Similarly, the same constituent components as in the second embodiment are given the same reference numerals as in the second embodiment, and the descriptions thereof will be omitted.

Configuration of ECU 11

Figure 9:
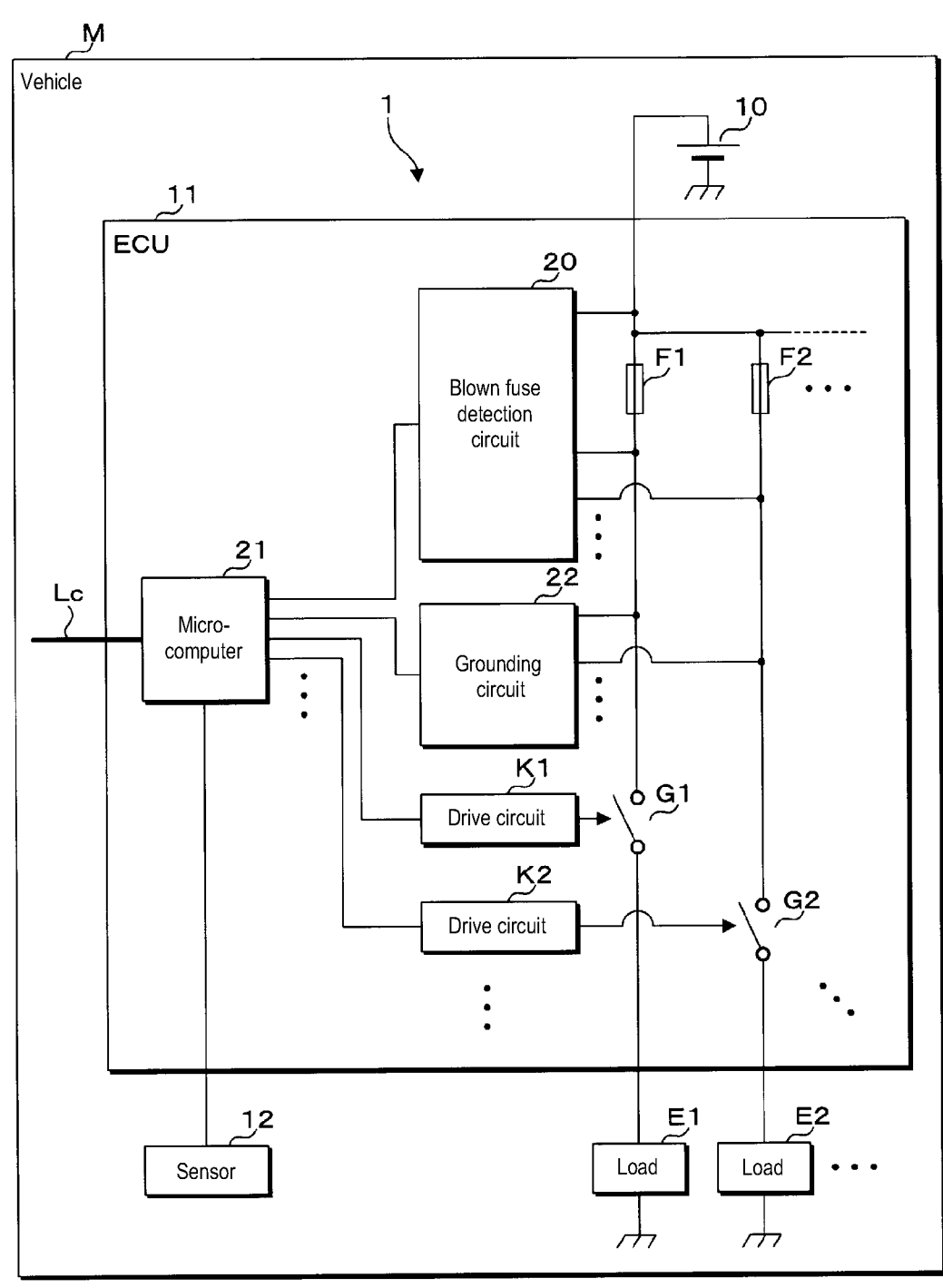
FIG. 9 is a block diagram showing a configuration of a main portion of an ECU according to a fifth embodiment.

FIG. 9 is a block diagram showing a configuration of a main portion of an ECU 11 according to the fifth embodiment. When comparing the fourth and fifth embodiments, the configurations of the ECUs 11 are different. The ECU 11 according to the fifth embodiment includes the blown fuse detection circuit 20, the microcomputer 21, and the plurality of fuses F1, F2, and so on as in the fourth embodiment. The ECU 11 according to the fifth embodiment further includes the grounding circuit 22, a plurality of power supply switches G1, G2, and so on, and a plurality of drive circuits K1, K2, and so on.

The grounding circuit 22, the power supply switch Gi, and the drive circuit Ki operate in the same manner as in the second embodiment. As described in the fourth embodiment, i is a given natural number. The power supply switch Gi is connected between the fuse Fi and the load Ei. If the power supply switch Gi is on, current flows from the positive electrode of the DC power supply 10 to the fuse Fi, the power supply switch Gi, and the load Ei in this order. Thus, power is supplied to the load Ei. In the fifth embodiment, in the current path of the fuse Fi, the power supply switch Gi is located downstream of the fuse Fi. The power supply switch Gi serves as a downstream switch. In the current path of the fuse Fi, the power supply switch Gi is located upstream of the load Ei. In the fifth embodiment, the downstream node of the fuse Fi is the connection node between the fuse Fi and the power supply switch Gi.

The grounding circuit 22 is separately connected to the microcomputer 21 and the downstream nodes of the plurality of fuses F1, F2, and so on. The drive circuit Ki is connected to the microcomputer 21. The microcomputer 21 outputs a high-level voltage and a low-level voltage to the drive circuit Ki. The microcomputer 21 switches the voltage output to the drive circuit Ki to the high-level voltage or to the low-level voltage. The drive circuit Ki switches the power supply switch Gi on or off according to the voltage input from the microcomputer 21 as with the drive circuit K1 according to the second embodiment.

The microcomputer 21 switches the power supply switch Gi on or off by switching the voltage output to the drive circuit Ki to the high-level voltage or to the low-level voltage. The microcomputer 21 determines whether or not the power supply switch Gi is to be switched on or off, based on data received via the communication line Lc or sensor data input from the sensor 12, for example. The microcomputer 21 switches the power supply switch Gi on or off according to the result of the determination.

The microcomputer 21 outputs a high-level voltage or a low-level voltage to the grounding circuit 22. The microcomputer 21 switches the voltage output to the grounding circuit 22 to the high-level voltage or to the low-level voltage. If the microcomputer 21 switches the voltage output to the grounding circuit 22 from the low-level voltage to the high-level voltage, the grounding circuit 22 grounds the respective downstream nodes of the fuses F1, F2, and so on through the first grounding resistor 61. If the microcomputer 21 switches the voltage output to the grounding circuit 22 from the high-level voltage to the low-level voltage, the grounding circuit 22 releases the grounding of all the components grounded through the first grounding resistor 61.

In the case where no grounding circuit 22 is provided, if at least one of the plurality of power supply switches G1, G2, and so on is off, the blown fuse detection circuit 20 may not operate properly. In the case of the ECU 11 according to the fifth embodiment, if at least one of the plurality of power supply switches G1, G2, and so on is off, the microcomputer 21 switches the voltage output to the grounding circuit 22 to the high-level voltage. Thus, the grounding circuit 22 grounds the respective downstream nodes of the fuses F1, F2, and so on through the first grounding resistor 61. As a result, the blown fuse detection circuit 20 operates properly.

Configuration of Grounding Circuit 22

Figure 10:
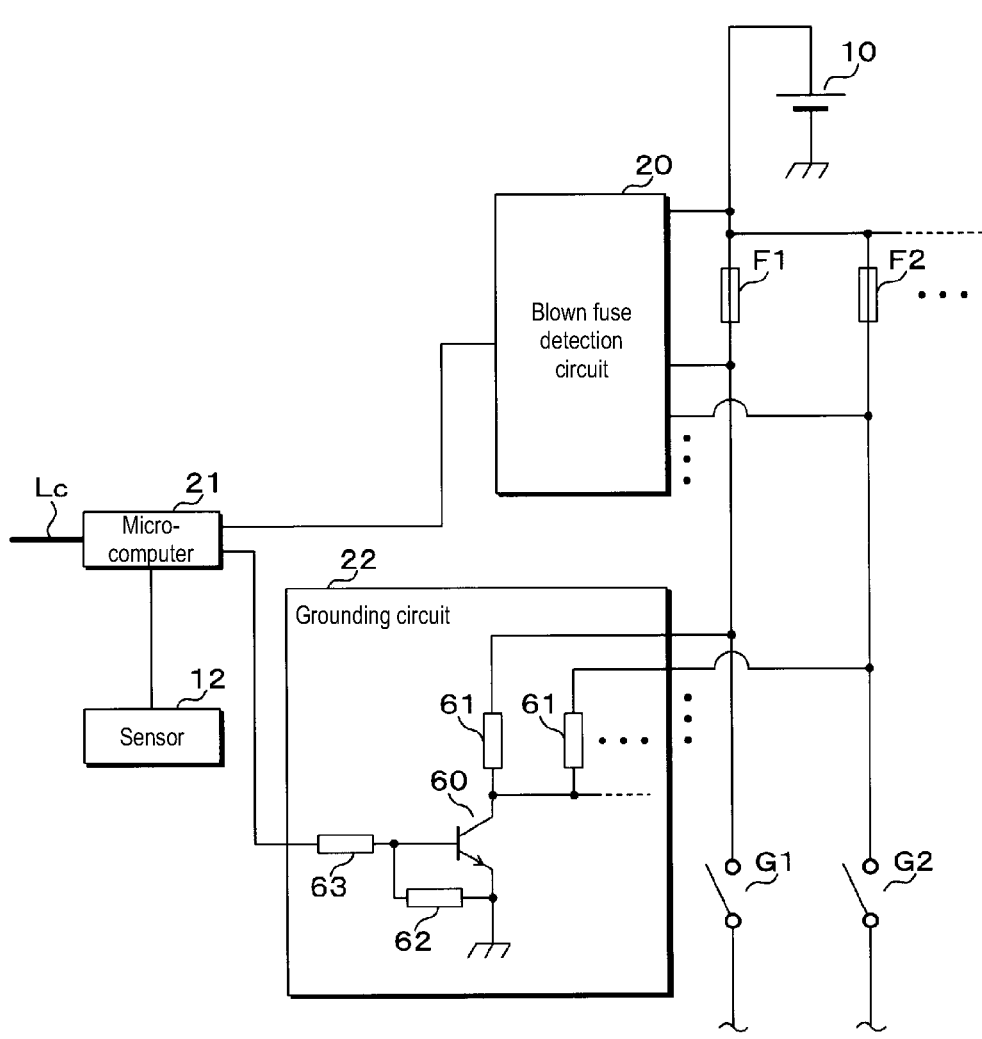
FIG. 10 is a circuit diagram for a ground circuit.

FIG. 10 is a circuit diagram for the grounding circuit 22. As in the second embodiment, the grounding circuit 22 includes the grounding switch 60, the second grounding resistor 62, and the third grounding resistor 63. These components are connected in the same manner as in the second embodiment. The grounding circuit 22 according to the fifth embodiment further includes a plurality of first grounding resistors 61. One end of each of the plurality of first grounding resistors 61 is connected to the downstream node of the corresponding fuse of the fuses F1, F2, and so on. The other end of each of the first grounding resistors 61 is connected to the collector of the grounding switch 60.

As in the second embodiment, the microcomputer 21 switches the grounding switch 60 on or off by switching the voltage output to the grounding circuit 22 to the high-level voltage or to the low-level voltage. If the microcomputer 21 switches on the grounding switch 60, the downstream nodes of the fuses F1, F2, and so on are grounded through the first grounding resistors 61. If the grounding switch 60 is on, current flows from the downstream node of the fuse Fi to the corresponding first grounding resistor 61 and the grounding switch 60 in this order. The path of the current flowing from the downstream node of the fuse Fi on the current path through the corresponding first grounding resistor 61 and the grounding switch 60 serves as a third current path. The plurality of first grounding resistors 61 are respectively located on the plurality of third current paths. The grounding switch 60 is provided on the common section of the plurality of third current paths. In the fifth embodiment, the respective current paths of the plurality of fuses F1, F2, and so on serve as specific paths.

Operation of Microcomputer 21

If all the power supply switches G1, G2, and so on are on, the blown fuse detection circuit 20 operates properly as in the fourth embodiment. Therefore, if all the power supply switches G1, G2, and so on are on, the microcomputer 21 determines whether or not at least one of the plurality of fuses F1, F2, and so on has blown based on the output voltage of the blown fuse detection circuit 20 while maintaining the voltage output to the grounding circuit 22 at the low-level voltage, as in the fourth embodiment.

If at least one of the plurality of power supply switches G1, G2, and so on is off, the microcomputer 21 switches on the grounding switch 60. In the state where the grounding switch 60 is on, the microcomputer 21 determines whether or not at least one of the plurality of fuses F1, F2, and so on has blown, based on the voltage output from the blown fuse detection circuit 20, as in the fourth embodiment.

As in the second embodiment, the resistance value R51 of each first detection resistor 51 in the blown fuse detection circuit 20 is sufficiently large. The resistance value R61 of each first grounding resistor 61 in the grounding circuit 22 is relatively small. Therefore, in the case where at least one of the plurality of power supply switches G1, G2, and so on is off, when the microcomputer 21 switches on the grounding switch 60, the blown fuse detection circuit 20 operates properly.

Effects of ECU 11

The ECU 11 according to the fifth embodiment achieves the same effects as those achieved by the ECU 11 according to the fourth embodiment. In the case of the ECU 11 according to the fifth embodiment, if at least one of the plurality of power supply switches G1, G2, and so on is off, the grounding switch 60 is switched on. Thus, the downstream nodes of all the fuses F1, F2, and so on are grounded through the first grounding resistors 61. As a result, the blown fuse detection circuit 20 operates properly.

Sixth Embodiment

In the fifth embodiment, the ECU 11 controls the power supply to all the loads E1, E2, and so on. However, the power supply to some of the loads E1, E2, and so on may be controlled.

Hereinafter, a sixth embodiment will be described with respect to the differences from the fifth embodiment. Components other than those described below are the same as those in the fifth embodiment, and therefore, the same constituent components as in the fifth embodiment are given the same reference numerals as in the fifth embodiment, and the descriptions thereof will be omitted.

Configuration of ECU 11

Figure 11:
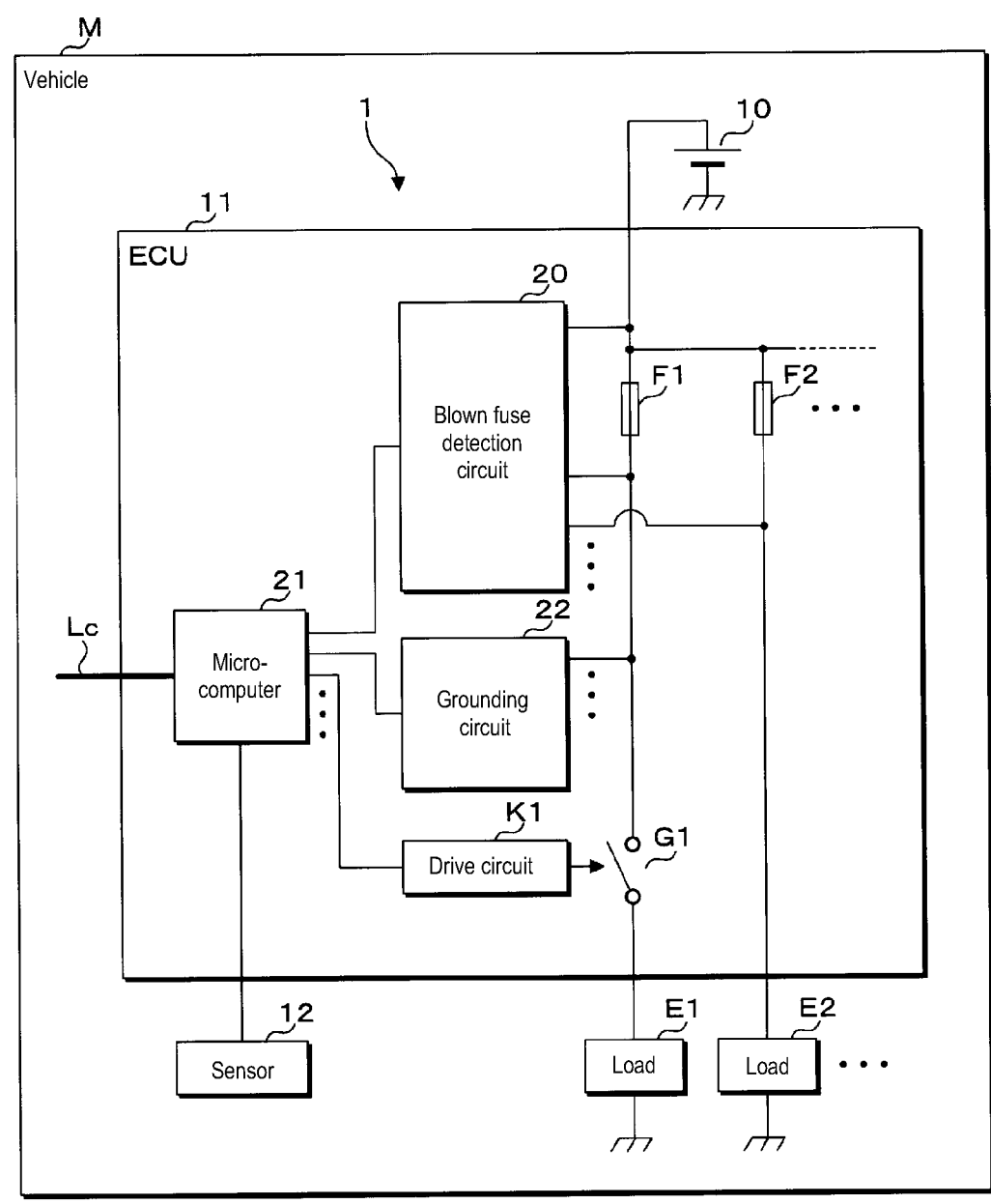
FIG. 11 is a block diagram showing a configuration of a main portion of an ECU according to a sixth embodiment.

FIG. 11 is a block diagram showing a configuration of a main portion of an ECU 11 according to the sixth embodiment. In the ECU 11 according to the sixth embodiment, at least one of the current paths of the fuses F1, F2, and so on is not provided with a power supply switch. In the example in FIG. 11, the power supply switch G2 is not provided in the current path of the fuse F2. In the current path where no power supply switch is provided, the fuse is connected directly to the load. In the current paths of the fuses F1, F2, and so on, the current paths provided with a power supply switch are specific paths.

The number of the first grounding resistors 61 included in the grounding circuit 22 is the same as the number of specific paths. One end of each of one or more first grounding resistors 61 is connected to the downstream node of the fuse on the corresponding specific path of one or more specific paths.

If the grounding switch 60 is on, currents flow from the downstream nodes of the fuses on the specific paths to the first grounding resistors 61 and the grounding switch 60 in this order. The paths of the currents flowing from the downstream nodes on the current paths of the fuses on the specific paths through the first grounding resistors 61 and the grounding switch 60 serve as third current paths. The grounding switch 60 is located on the common section of the one or more third current paths. If the grounding switch 60 is on, the downstream nodes of the fuses on the one or more specific paths are grounded through the grounding switch 60.

Operation of Microcomputer 21

If all the power supply switches are on, the blown fuse detection circuit 20 operates properly as in the fifth embodiment. Therefore, if all the power supply switches are on, the microcomputer 21 determines whether or not at least one of the plurality of fuses F1, F2, and so on has blown based on the output voltage of the blown fuse detection circuit 20 while maintaining the voltage output to the grounding circuit 22 at the low-level voltage.

If at least one power supply switch is off, the microcomputer 21 switches on the grounding switch 60. In the state where the grounding switch 60 is on, the microcomputer 21 determines whether or not at least one of the plurality of fuses F1, F2, and so on has blown, based on the voltage output from the blown fuse detection circuit 20. As in the fifth embodiment, if the output voltage of the blown fuse detection circuit 20 is higher than or equal to the reference voltage, the microcomputer 21 determines that at least one of the plurality of fuses F1, F2, and so on has blown. If the output voltage of the blown fuse detection circuit 20 is lower than the reference voltage, the microcomputer 21 determines that none of the fuses F1, F2, and so on has blown.

As in the fifth embodiment, the resistance value R51 of each first detection resistor 51 in the blown fuse detection circuit 20 is sufficiently large. The resistance value R61 of each first grounding resistor 61 in the grounding circuit 22 is relatively small. Therefore, in the case where at least one power supply switch is off, when the microcomputer 21 switches on the grounding switch 60, the blown fuse detection circuit 20 operates properly.

Effects of ECU 11

The ECU 11 according to the sixth embodiment achieves the same effects as those achieved by the ECU 11 according to the fourth embodiment. In the ECU 11 according to the sixth embodiment, if at least one power supply switch is off, the grounding switch 60 is switched on. Thus, the downstream nodes of the fuses on the specific paths are grounded through the first grounding resistors 61. As a result, the blown fuse detection circuit 20 operates properly.

Seventh Embodiment

In the sixth embodiment, the upstream switch 13 may be provided as in the third embodiment.

Hereinafter, a seventh embodiment will be described with respect to the differences from the sixth embodiment. Components other than those described below are the same as those in the sixth embodiment, and therefore, the same constituent components as in the sixth embodiment are given the same reference numerals as in the sixth embodiment, and the descriptions thereof will be omitted. The same constituent components as in the third embodiment are given the same reference numerals as in the third embodiment, and the descriptions thereof will be omitted.

Configuration of Power Supply System 1

Figure 12:
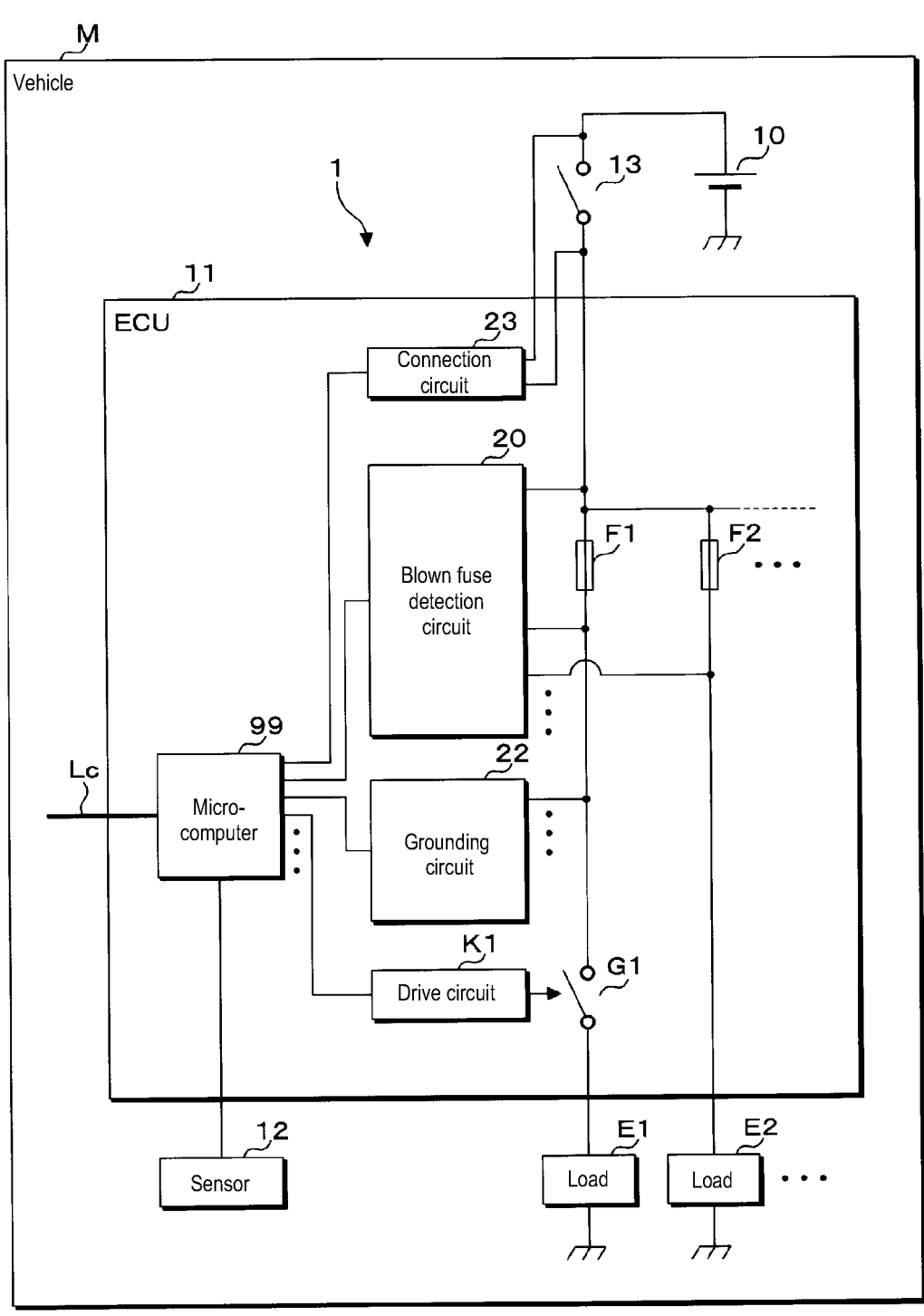
FIG. 12 is a block diagram showing a configuration of a main portion of an ECU according to a seventh embodiment.

FIG. 12 is a block diagram showing a configuration of a main portion of an ECU 11 according to the seventh embodiment. In the seventh embodiment, as in the sixth embodiment, in the current paths of the fuses F1, F2, and so on, the section located upstream of the fuses F1, F2, and so on is shared among them. The upstream switch 13 is located on this common section. The upstream switch 13 is located between the positive electrode of the DC power supply 10 and the fuse Fi. The upstream switch 13 is switched on or off as in the third embodiment.

Configuration of ECU 11

The ECU 11 according to the seventh embodiment includes the same constituent components as in the ECU 11 according to the sixth embodiment. The ECU 11 according to the seventh embodiment further includes the connection circuit 23. The connection circuit 23 is connected in the same manner as in the third embodiment. The connection circuit 23 operates according to the voltage input from the microcomputer 21, in the same manner as in the third embodiment. The microcomputer 21 switches the first connection switch Q1 (see FIG. 7) in the connection circuit 23 on or off by switching the voltage output to the connection circuit 23 to a high-level voltage or to a low-level voltage.

If the microcomputer 21 switches on the first connection switch Q1, the two ends of the upstream switch 13 are electrically connected via the first connection resistor 71. If the microcomputer 21 switches off the first connection switch Q1, the electrical connection via the first connection resistor 71 is interrupted.

Operation of Microcomputer 21

If the upstream switch 13 is on, the configuration of the power supply system 1 according to the seventh embodiment is the same as the configuration of the power supply system 1 according to the sixth embodiment. Therefore, if the upstream switch 13 is on, the microcomputer 21 operates in the same manner as in the sixth embodiment.

In the case where the upstream switch 13 is off, if at least one power supply switch is off, the microcomputer 21 first switches on the grounding switch 60 of the grounding circuit 22. Next, the microcomputer 21 switches on the first connection switch Q1 of the connection circuit 23. In the state where the grounding switch 60 and the first connection switch Q1 are on, the microcomputer 21 determines whether or not the fuse F1 has blown, based on the voltage output from the blown fuse detection circuit 20, as in the sixth embodiment.

In the state where the upstream switch 13 is off, if the first connection switch Q1 is on, the upstream voltage, which is the voltage at the upstream node of the fuse F1, is lower than the power supply voltage of the DC power supply 10 due to the operation of the first connection resistor 71. However, if the resistance value R51 of the first detection resistor 51 of the blown fuse detection circuit 20 is sufficiently large, the blown fuse detection circuit 20 operates properly as in the case where the upstream switch 13 is on.

Effects of ECU 11 and Modifications of Seventh Embodiment

The ECU 11 according to the seventh embodiment achieves the same effects as those achieved by the ECU 11 according to the sixth embodiment. In the seventh embodiment, the upstream switch 13 may be provided within the ECU 11.

Modifications of Fourth and Fifth Embodiments

In each of the fourth and fifth embodiments, as in the seventh embodiment, the upstream switch 13 may be located on the upstream common section of the current paths of the fuses F1, F2, and so on. If this is the case, the ECU 11 further includes the connection circuit 23 as in the seventh embodiment.

In a modification of the fourth embodiment, the operation of the microcomputer 21 is the same as the operation according to the seventh embodiment in the case where all the power supply switches are on. In a modification of the fifth embodiment, the microcomputer 21 performs the same operation as in the seventh embodiment.

Eighth Embodiment

In the sixth embodiment, a new switch may be provided on each of the current paths of the fuses F1, F2, and so on.

Hereinafter, an eighth embodiment will be described with respect to the differences from the sixth embodiment. Components other than those described below are the same as those in the sixth embodiment, and therefore, the same constituent components as in the sixth embodiment are given the same reference numerals as in the sixth embodiment, and the descriptions thereof will be omitted.

Configuration of Power Supply System 1

Figure 13:
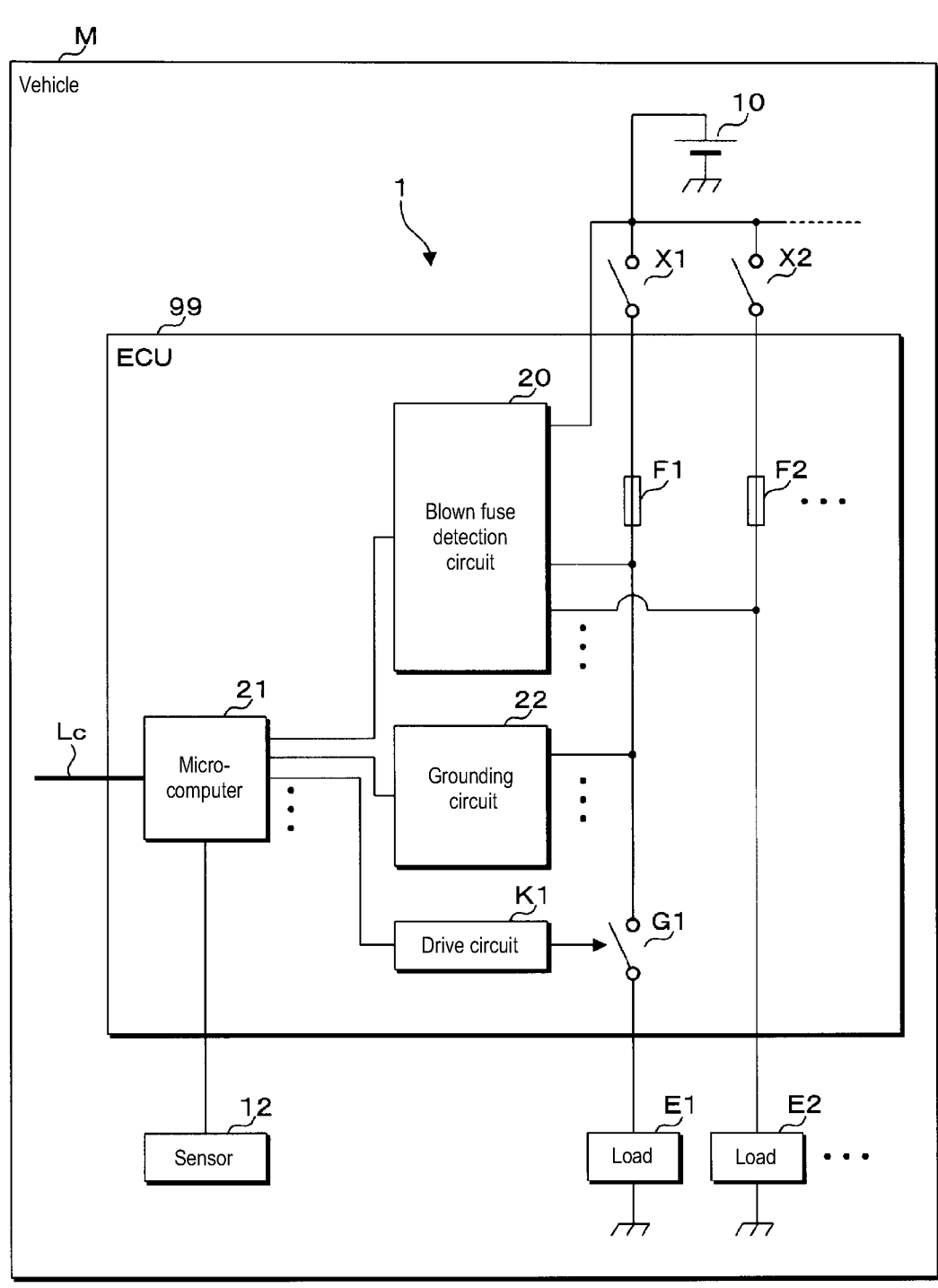
FIG. 13 is a block diagram showing a configuration of a main portion of a power supply system according to an eighth embodiment.

FIG. 13 is a block diagram showing a configuration of a main portion of a power supply system 1 according to the eighth embodiment. In the eighth embodiment, the power supply system 1 further includes a plurality of second upstream switches X1, X2, and so on. Each of the second upstream switches X1, X2, and so on is switched on or off by a drive circuit (not shown).

In the current path of the fuse Fi, a second upstream switch Xi is located upstream of the fuse Fi. As described in the fourth and fifth embodiments, i is a given natural number. The respective current paths of the fuses F1, F2, and so on serve as second specific paths. The second upstream switch Xi is located downstream of the DC power supply 10. In the current paths of the fuses F1, F2, and so on, the section located upstream of the second upstream switch Xi is shared among them. In the eighth embodiment, the upstream node is the common connection node located upstream of the second upstream switches X1, X2, and so on. Therefore, the fuse voltage of the fuse Fi is the voltage between the connection node located upstream of the second upstream switch Xi (the upstream node) and the downstream node of the fuse Fi.

Configuration of ECU 11

In the eighth embodiment, the emitter of the detection switch 50 in the blown fuse detection circuit 20 is connected to the upstream node located upstream of the second upstream switches X1, X2, and so on. In the case where the respective downstream nodes of the fuses F1, F2, and so on are grounded through the loads or the first grounding resistors 61, when all the second upstream switches X1, X2, and so on are on, the blown fuse detection circuit operates properly.

Operation of Microcomputer 21

In the case where all the second upstream switches X1, X2, and so on are on, the microcomputer 21 operates in the same manner as in the sixth embodiment.

Effects of ECU 11 and Modifications of Eighth Embodiment

The ECU 11 according to the eighth embodiment achieves the same effects as those achieved by the ECU 11 according to the sixth embodiment.

Note that, in the eighth embodiment, a second connection circuit configured in the same manner as the connection circuit 23 may be connected between the two ends of the second upstream switch Xi. If this is the case, when the second upstream switch Xi is off, the microcomputer 21 switches on the first connection switch Q1 in the second connection circuit. The second upstream switch Xi may be located within the ECU 11.

Furthermore, the current paths of the fuses F1, F2, and so on may include a current path that is not provided with a second upstream switch. If this is the case, the current path on which the second upstream switch is provided, of the current paths of the fuses F1, F2, and so on, serves as the second specific path. In the case where all the second upstream switches provided in the ECU 11 are on, the microcomputer 21 determines whether or not at least one of the plurality of fuses F1, F2, and so on has blown.

Modifications of First to Third Embodiments

In each of the first to third embodiments, as in the eighth embodiment, a second upstream switch X1 may be provided upstream of the fuse F1 in the current path of the fuse F1. In the case where the second upstream switch X1 is on, the microcomputer 21 determines whether or not the fuse F1 has blown.

Modifications of Fourth, Fifth, and Seventh Embodiments

In each of the fourth, fifth, and seventh embodiments, as in the eighth embodiment, a second upstream switch may be provided on each of one or more current paths of the current paths of the fuses F1, F2, and so on. In the modification of the seventh embodiment, each of the one or more second upstream switches is located downstream of the common upstream switch 13. In the case where all the second upstream switches provided in the ECU 11 are on, the microcomputer 21 determines whether or not at least one of the plurality of fuses F1, F2, and so on has blown.

Modifications of Second, Third, and Fifth to Eighth Embodiments

In the second, third, and fifth to eighth embodiments, the grounding switch 60 is not limited to an NPN bipolar transistor, and may be an N-channel FET (Field Effect Transistor), for example. The grounding switch 60 need only function as a switch. Therefore, the grounding switch 60 may be a relay contact, for example.

Modifications of Third and Seventh Embodiments

In the third and seventh embodiments, the first connection switch Q1 is not limited to a PNP bipolar transistor, and may be a P-channel FET, for example. Also, the second connection switch Q2 is not limited to an NPN bipolar transistor, and may be an N-channel FET, for example. Furthermore, the first connection switch Q1 need only function as a switch. Therefore, the first connection switch Q1 may be a relay contact, for example.

Modifications of Second, Third, and Fifth to Eighth Embodiments

In the second, third, and fifth to eighth embodiments, the microcomputer 21 may switch the power supply switches on or off according to the temperatures of the connection lines (electric wires) connected to the power supply switches. The microcomputer 21 switches off each power supply switch if the temperature of the corresponding connection line increases to a temperature higher than or equal to a certain temperature. With this configuration, the fuse on the current path on which a power supply switch is provided is less likely to blow. The temperature of the connection line may be detected by a temperature sensor, or calculated based on the current value of the current flowing through the power supply switch. Furthermore, the microcomputer that switches on or off each power supply switch may be a microcomputer different from the microcomputer 21 installed in the ECU 11.

Modifications of First to Eighth Embodiments

In the blown fuse detection circuit 20, the collector of the detection switch 50 may be connected directly to one end of the third detection resistor 53. In this configuration, if the detection switch 50 is on, the upstream voltage, e.g. the power supply voltage of the DC power supply 10, is output to the microcomputer 21. In addition, in the second current path, the second detection resistor 52 may be located upstream of the detection switch 50.

In addition, the detection switch 50 is not limited to a PNP bipolar transistor, and may be a P-channel FET, for example. Furthermore, the location of the fuses F1, F2, and so on is not limited to the substrate B. Each of the fuses F1, F2, and so on may be provided within a fuse box, for example. In addition, the blown fuse detection circuit 20 may be constituted by a microcomputer (not shown). If this is the case, the microcomputer determines whether or not the fuse Fi has blown, based on the voltage between the upstream node and the downstream node of the fuse Fi. The microcomputer outputs a voltage to the microcomputer 21 according to the result of the determination.

The technical features (constituent elements) described in the first to eighth embodiments can be combined with each other, and new technical features can be formed by combining them.

The first to eighth embodiments disclosed herein should be considered to be illustrative in all respects and not restrictive. The scope of the present disclosure is indicated by the scope of the claims, not the meaning described above, and is intended to include meanings equivalent to the scope of the claims and all changes within the scope.

The invention claimed is:

1. An on-board device comprising:
   a fuse; and
   a blown fuse detection circuit configured to detect that the fuse has blown, the blown fuse detection circuit includes a circuit switch provided on a second current path of a current flowing from a connection node located upstream of the fuse in the current path; and a circuit resistor provided downstream of the circuit switch in the second current path, wherein the circuit switch is configured to switch from off to on when the fuse voltage increases to a voltage higher than or equal to the voltage threshold value; and wherein the blown fuse detection circuit is configured to:

monitor a fuse voltage between two connection nodes respectively located upstream and downstream of the fuse in a current path of a current flowing from a positive electrode of a DC power supply through the fuse;

output a voltage lower than a reference voltage if the fuse voltage is lower than a voltage threshold value; and output a voltage higher than or equal to the reference voltage if the fuse voltage is higher than or equal to the voltage threshold value, and a voltage at an upstream end of the circuit resistor is output from the blown fuse detection circuit.

2. The on-board device according to claim 1, including;

a substrate, wherein a terminal of the fuse is attached to the substrate with solder.

3. The on-board device according to claim 1, wherein the blown fuse detection circuit includes a second circuit resistor located upstream of the circuit resistor in the second current path, when the circuit switch is on, the circuit resistor and the second circuit resistor divide a voltage at a connection node located upstream of the fuse in the current path, and the voltage divided by the circuit resistor and the second circuit resistor is output from the blown fuse detection circuit.

4. The on-board device according to claim 1, including:

a device switch;

a device resistor connected in series to the device switch; and a processing unit configured to perform processing, wherein a series circuit including the device switch and the device resistor is connected between two ends of an upstream switch located upstream of the fuse in the current path, and the processing unit is configured to:

switch on the device switch; and in a state where the device switch is on, determine whether or not the fuse has blown, based on a voltage output from the blown fuse detection circuit.

5. The on-board device according to claim 1, including:

a path switch and a path resistor provided on a third current path of a current flowing from a connection node located downstream of the fuse in the current path; and a processing unit configured to perform processing, the processing unit is configured to:

switch on the path switch; and in a state where the path switch is on, determine whether or not the fuse has blown, based on a voltage output from the blown fuse detection circuit.

6. The on-board device according to claim 5, wherein a downstream switch is provided downstream of the fuse in the current path, and in the current path, a current flows from a connection node located between the fuse and the downstream switch through the third current path.

7. The on-board device according to claim 1, including:

a plurality of fuses, wherein a plurality of currents flowing from the positive terminal of the DC power supply respectively flow through the plurality of fuses, and the blown fuse detection circuit is configured to:

monitor the fuse voltage in each of a plurality of current paths of the plurality of currents flowing from the positive electrode of the DC power supply through the plurality of fuses, output a voltage lower than the reference voltage if all the fuse voltages are lower than the voltage threshold value; and output a voltage higher than or equal to the reference voltage if at least one of the plurality of fuse voltages is higher than or equal to the voltage threshold value.

8. The on-board device according to claim 7, wherein, in each of one or more specific paths included in the plurality of current paths, a current flows from a connection node located downstream of the fuse corresponding thereto through the third current path, the on-board device comprises:

a plurality of path resistors respectively provided on the one or more third current paths;

a path switch provided on a common section of the one or more third current paths; and a processing unit configured to perform processing, and the processing unit is configured to:

switch on the path switch; and in a state where the path switch is on, determine whether or not at least one of the plurality of fuses has blown, based on a voltage output from the blown fuse detection circuit.

9. The on-board device according to claim 8, wherein, in each of the specific paths, a downstream switch is provided downstream of the fuse corresponding thereto, and in each of the specific paths, a current flows from a connection node located between the fuse corresponding thereto and the downstream switch through the third current path corresponding thereto.

10. The on-board device according to claim 7, wherein, in each of one or more second specific paths included in the plurality of current paths, a second upstream switch is provided upstream of the fuse corresponding thereto, and the fuse voltage in each of the second specific paths is a voltage between a connection node located upstream of the second upstream switch and a connection node located downstream of the fuse corresponding thereto.

* * * * *